United States Patent [19]

Henneberger et al.

[11] Patent Number: 5,067,678
[45] Date of Patent: Nov. 26, 1991

[54] OPTIC CABLE MANAGEMENT SYSTEM

[75] Inventors: Roy L. Henneberger, Eagan; Ronald M. Weitnauer, Excelsior; Wayne A. Johnson, Rosemount, all of Minn.

[73] Assignee: ADC Telecommunications, Inc., Minneapolis, Minn.

[21] Appl. No.: 387,978

[22] Filed: Jul. 31, 1989

[51] Int. Cl.⁵ .............................................. H02G 3/04
[52] U.S. Cl. ...................................... 248/68.1; 248/58
[58] Field of Search .................... 248/49, 68.1, 223.4, 248/225.1, 295.1, 297.2, 297.3, 58, 65

[56] References Cited

U.S. PATENT DOCUMENTS

| | | | |
|---|---|---|---|
| 1,751,691 | 3/1930 | Flath | 248/223.4 X |
| 2,834,622 | 5/1958 | Reeves | 248/68.1 X |
| 2,891,750 | 6/1959 | Berquist | 248/68.1 X |
| 3,022,972 | 2/1962 | Bunston | 248/68.1 |
| 3,132,609 | 5/1964 | Chesley | 248/297.2 X |
| 3,485,937 | 12/1969 | Caveney | . |
| 3,915,420 | 10/1975 | Norris | 248/68.1 X |
| 4,149,710 | 4/1979 | Routh et al. | 248/49 X |

FOREIGN PATENT DOCUMENTS

| | | | |
|---|---|---|---|
| 1339214 | 12/1983 | France | 248/49 |
| 2181813 | 4/1987 | United Kingdom | 248/49 |

OTHER PUBLICATIONS

Ditel UPL-1000/UPT-1000/Corner Cable Guides brochure, TM 1986.
Tyton, Product Data Bulletin, The Lightguide System.
Panduit Corp., Product Bulletin E-FOA-1, Fiber Optic Cable Accessories.

Primary Examiner—Alvin C. Chin-Shue
Attorney, Agent, or Firm—Merchant, Gould, Smith, Edell, Welter & Schmidt

[57] ABSTRACT

A cable routing system is disclosed having a plurality of troughs. Each of the troughs includes walls cooperating to define a cable pathway. The trough has attachment members secured to the walls. The attachment members present cooperating surfaces which receive a mounting bracket of predetermined dimensions. The trough and attachment members are extruded such that the same cooperating members are presented along the entire longitudinal dimension of the wall. The cable routing system is designed to carry optical fiber cables.

9 Claims, 23 Drawing Sheets

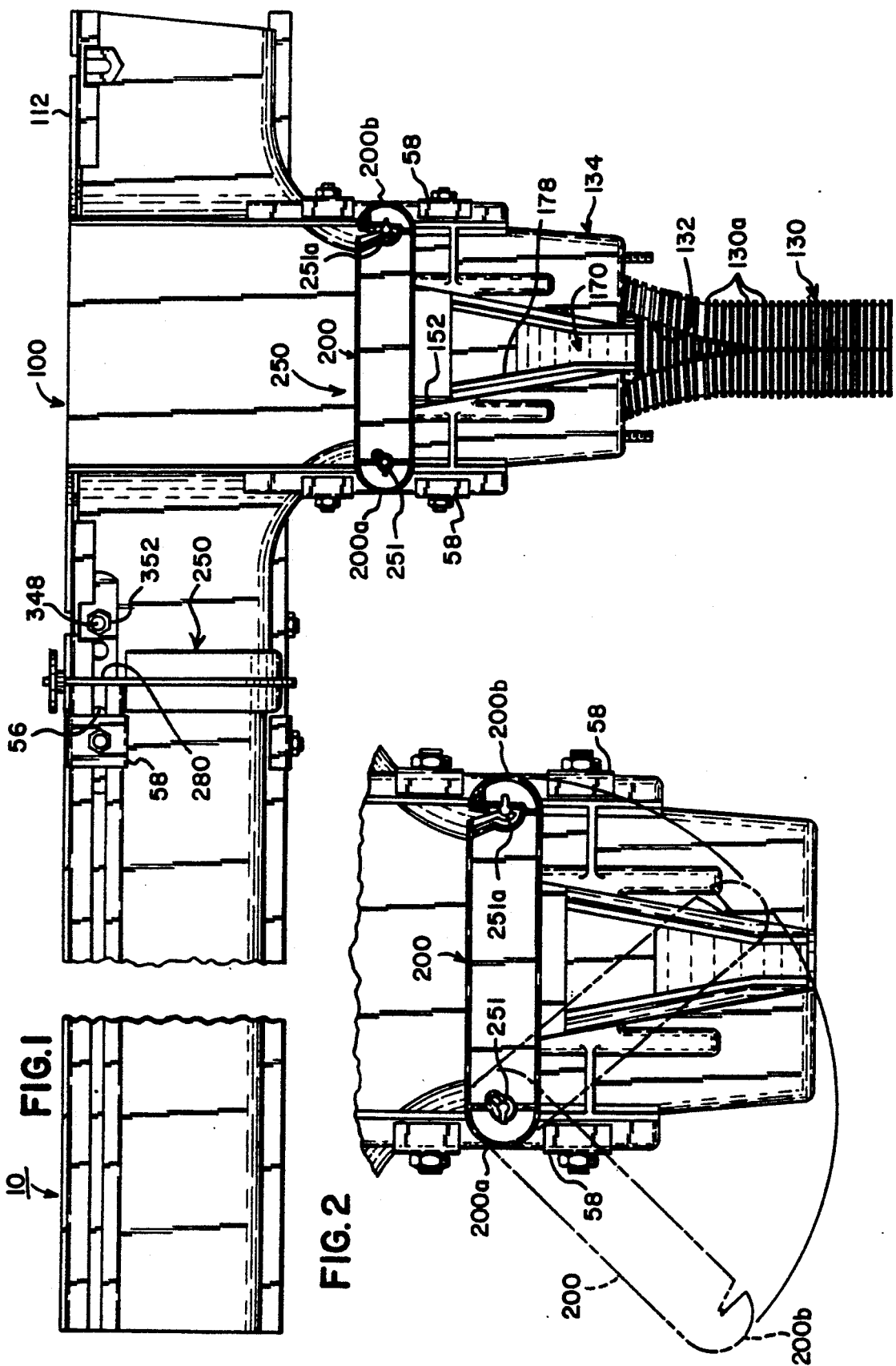

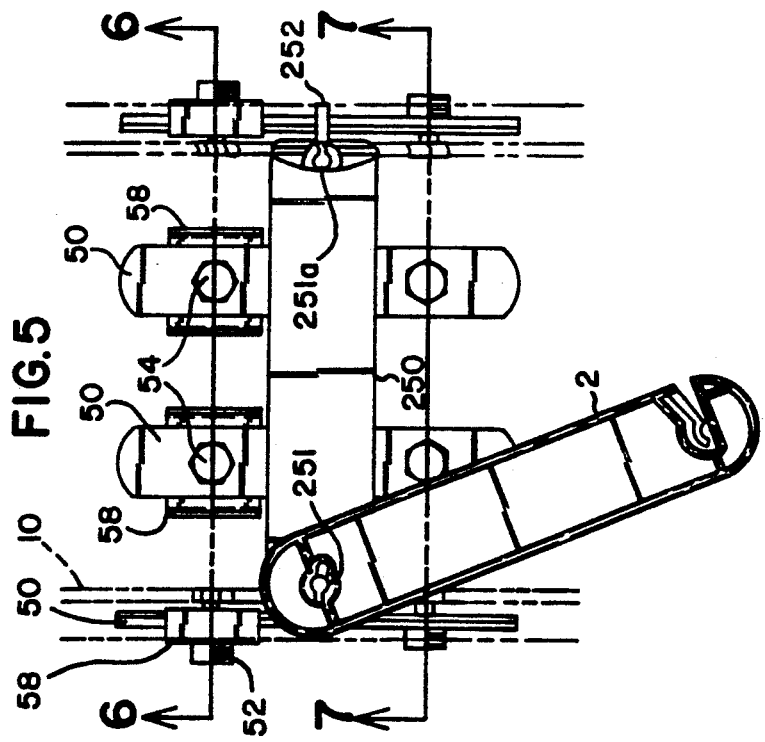
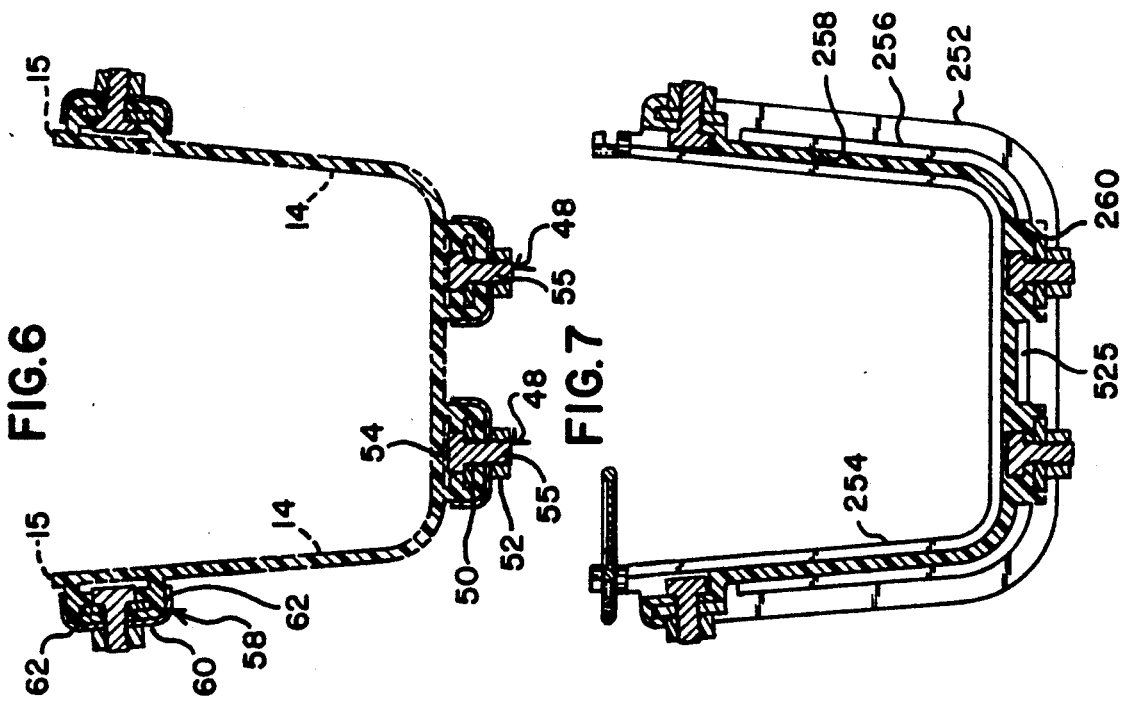

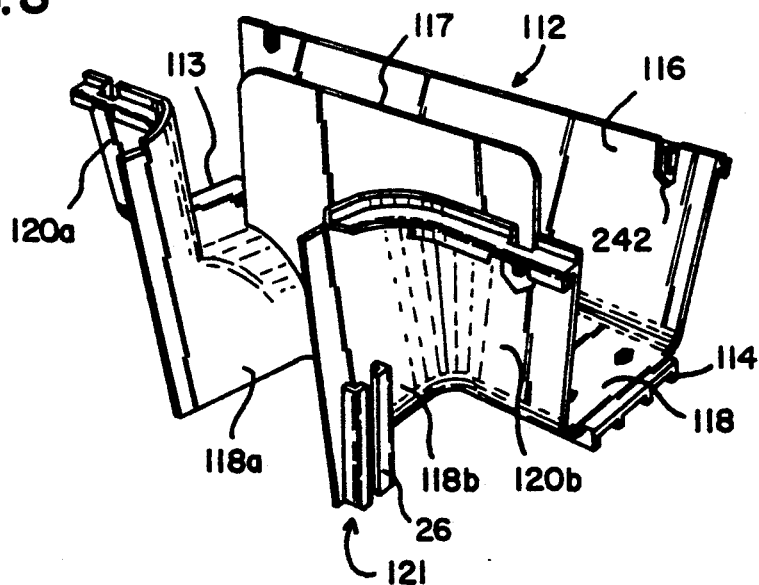
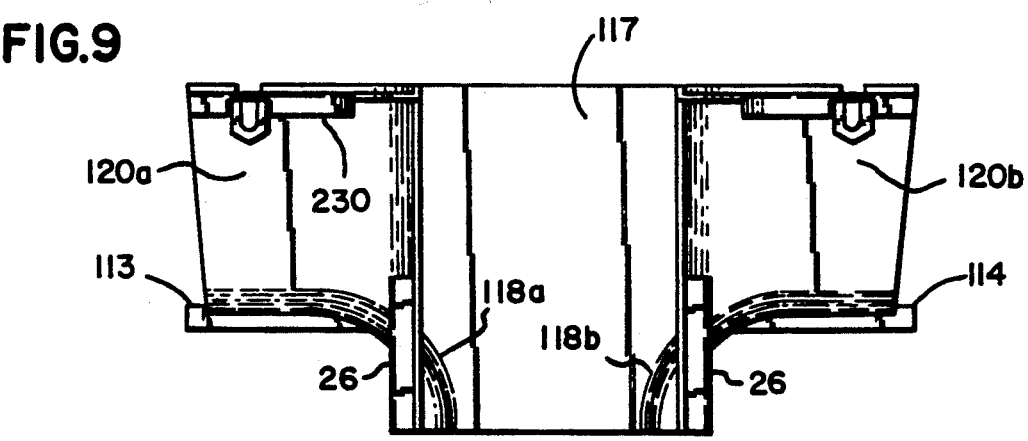
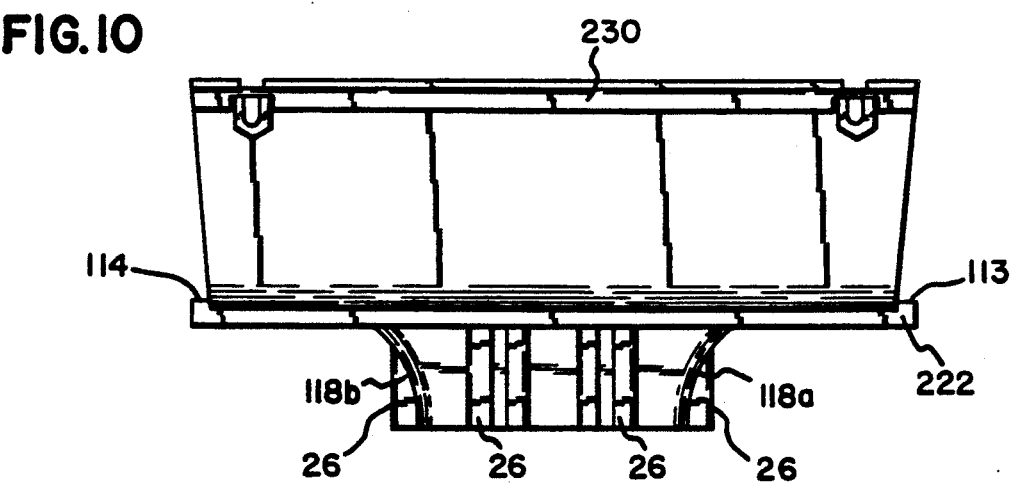

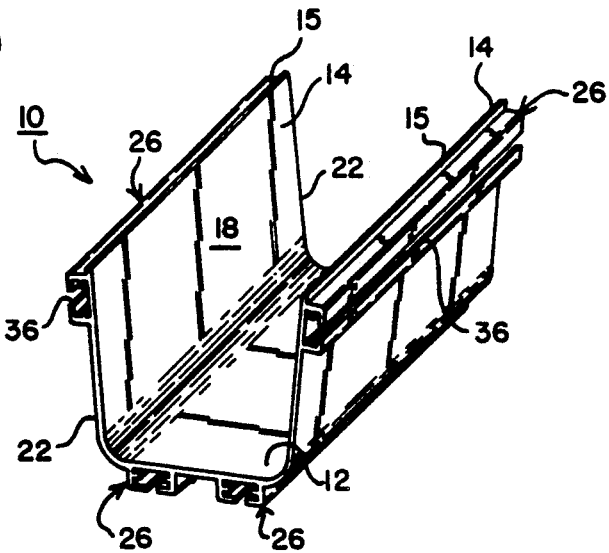
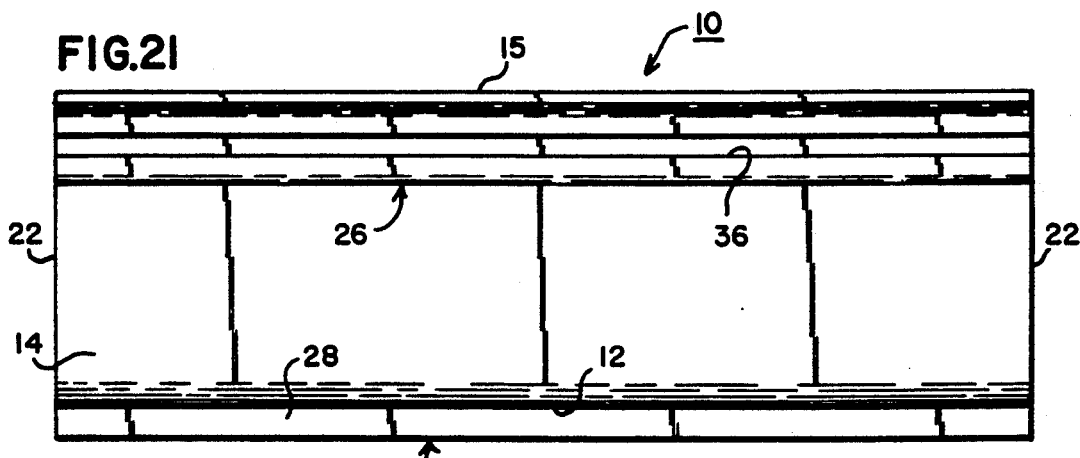
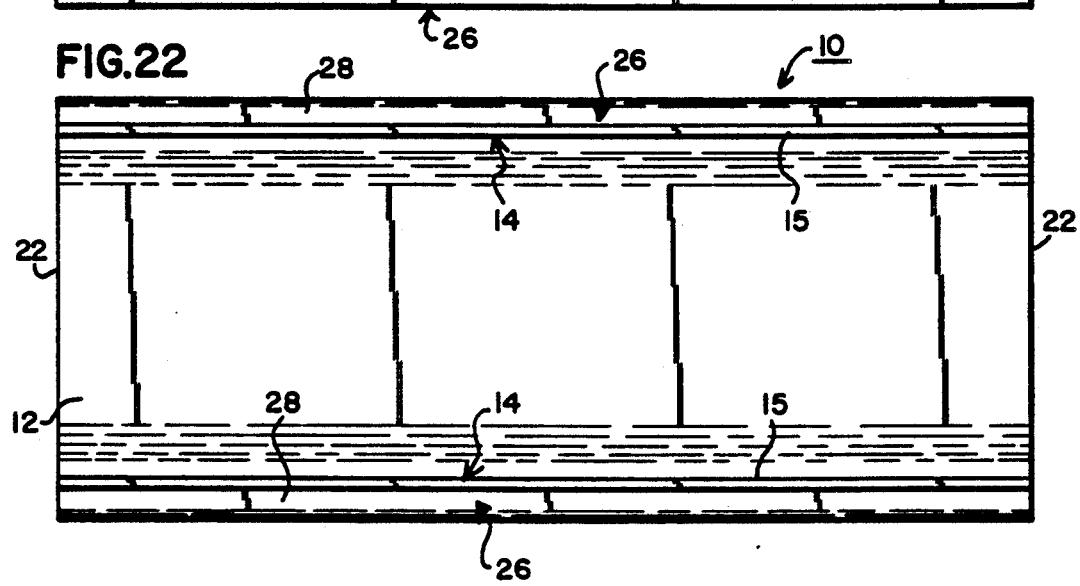

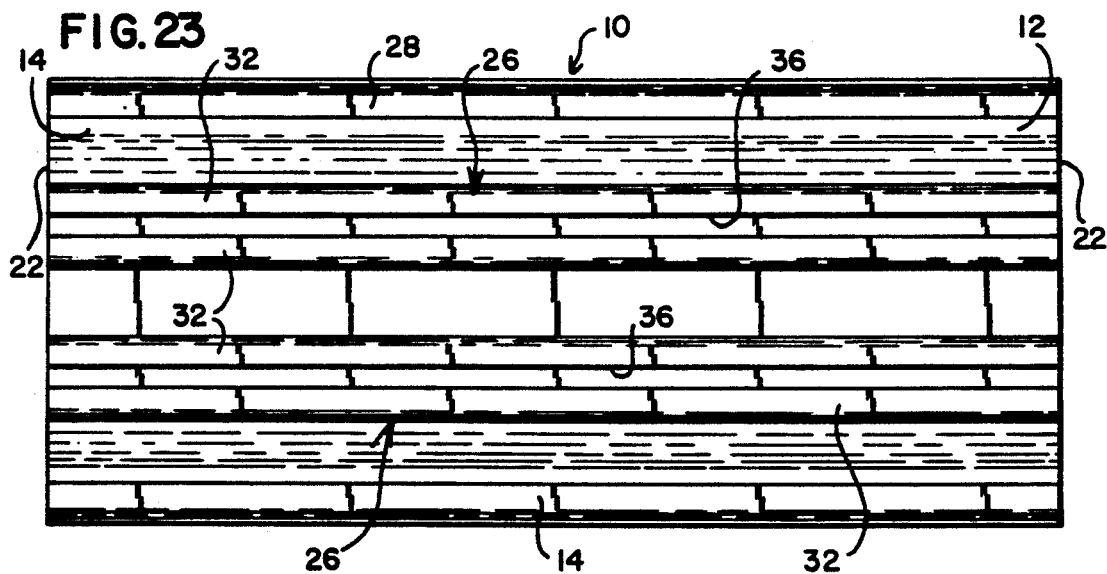
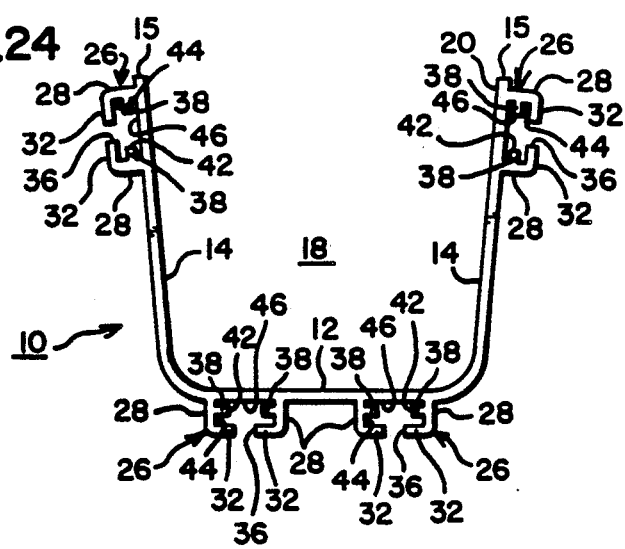

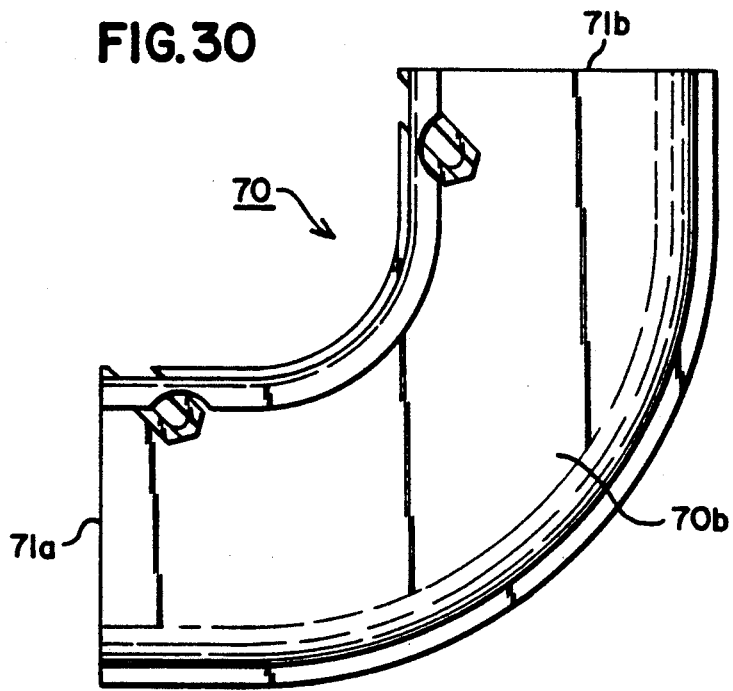
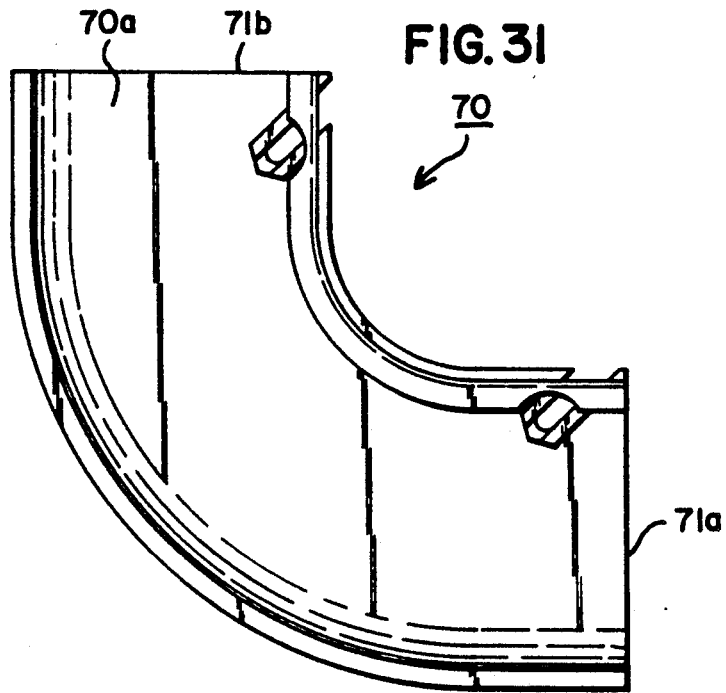

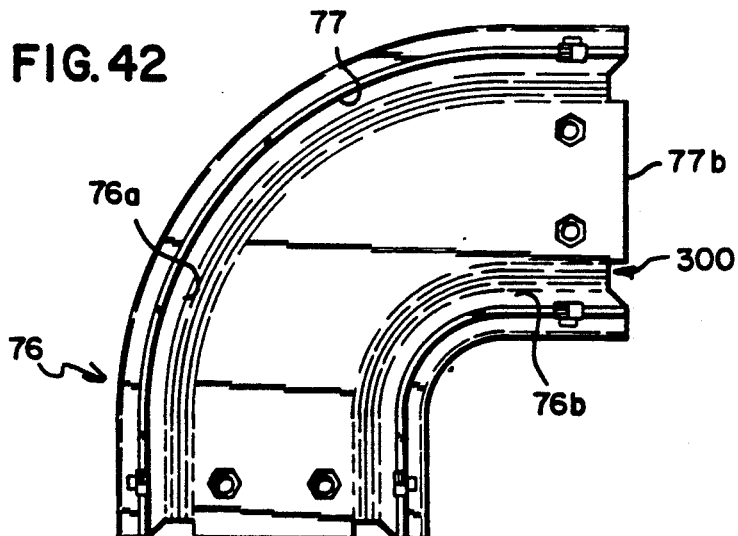
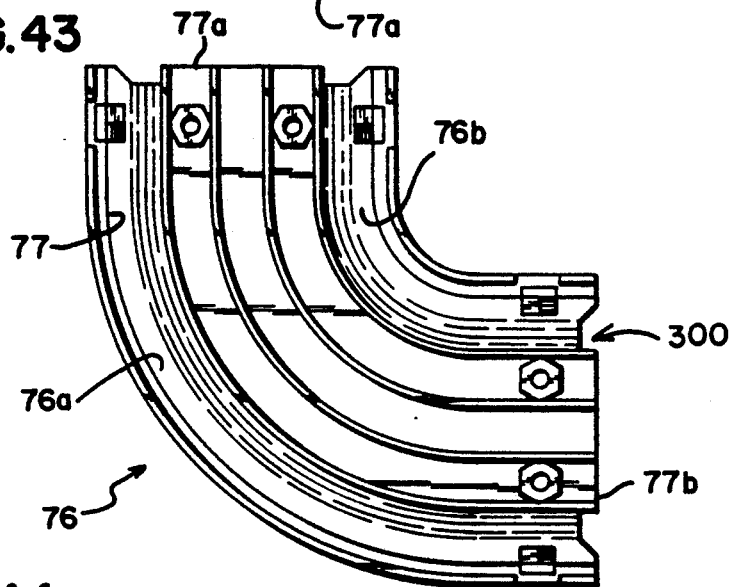
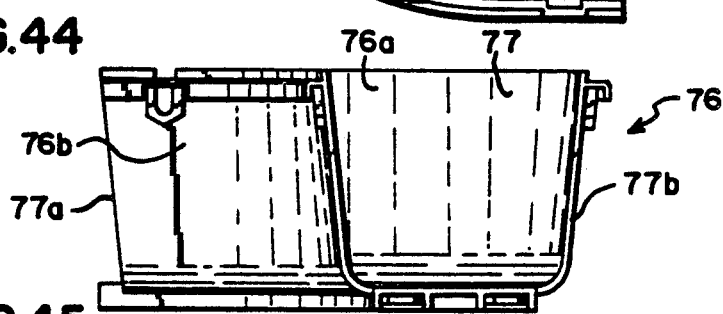
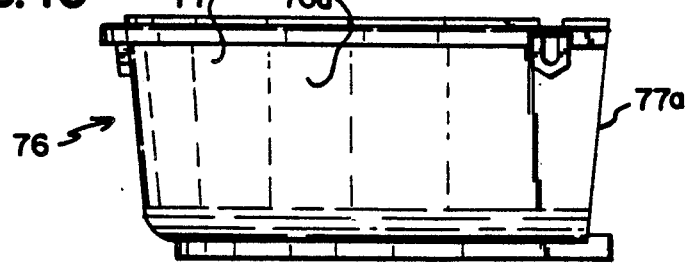

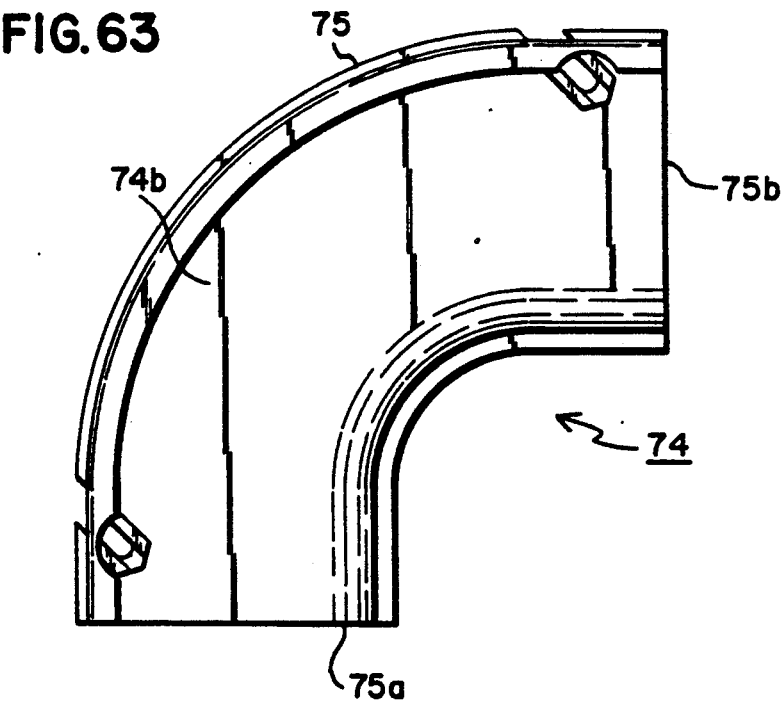
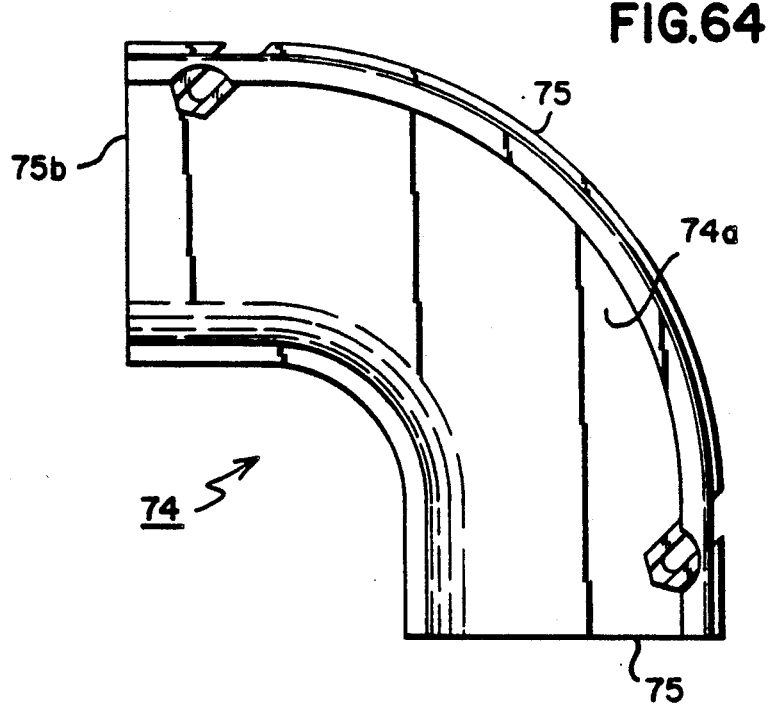

OPTIC CABLE MANAGEMENT SYSTEM

BACKGROUND OF THE INVENTION

1. Field of the Invention

This application pertains to a system for the management and routing of optical fiber cables. More particularly, this application pertains to an optical fiber routing system which is easily modified.

2. Background of the Invention

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

SUMMARY OF THE INVENTION

Accordingly to a preferred embodiment of the present invention, a cable routing system is disclosed for routing optical fiber cables between optical transmission equipment. The system includes a plurality of troughs, each having a plurality of walls defining a cable pathway. Attachment members are secured to each of the troughs. The attachment members include cooperating surfaces selected to receive a bracket of predetermined dimensions. The attachment member extends along the length of a wall, with the attachment member selected to present the same cooperating surfaces at any one of a plurality of locations along the longitudinal dimension of the wall. Accordingly, the trough can be cut to length and attached to other elements of the system to accommodate flexibility in the design of the routing system.

BRIEF DESCRIPTION OF THE DRAWINGS

FIG. 1 is a side elevation view of a portion of the cable routing system according to the present invention showing a trough and a cable take-off union;

FIG. 2 is an enlarged view of a portion of the view of FIG. 1;

FIG. 5 is a top plan view of the connecting elements joining the trough and the take-off union of FIG. 1 with the trough and take-off union shown in phantom;

FIG. 6 is a view taken along line 6—6 of FIG. 5;

FIG. 7 is a view taken along line 7—7 of FIG. 5;

FIG. 8 is a front, right side and top perspective view of a main body of the take-off union according to the present invention;

FIG. 9 is a front elevation view of the take-off union main body of FIG. 8;

FIG. 10 is a back elevation view of the take-off union main body of FIG. 8;

FIG. 20 is a left side, top and front perspective view of a trough of the present invention;

FIG. 21 is a front elevation view of the trough of FIG. 20 with the opposite side being substantially identical;

FIG. 22 is a top plan view of the trough of FIG. 20;

FIG. 23 is a bottom plan view of the trough of FIG. 20;

FIG. 24 is a right side end elevation view of the trough of FIG. 20 with the opposite end being substantially identical;

FIG. 30 is a right side elevation view of the elbow of FIG. 25;

FIG. 31 is a left side elevation view of the elbow of FIG. 25;

FIG. 42 is a top plan view of the elbow of FIG. 39;

FIG. 43 is a bottom plan view of the elbow of FIG. 39;

FIG. 44 is a right side elevation view of the elbow of FIG. 39;

FIG. 45 is a left side elevation view of the elbow of FIG. 39;

FIG. 63 is a left side elevation view of the elbow of FIG. 58; and

FIG. 64 is a right side elevation view of the elbow of FIG. 58.

DESCRIPTION OF THE PREFERRED EMBODIMENT

A. Generally

Figure 3:
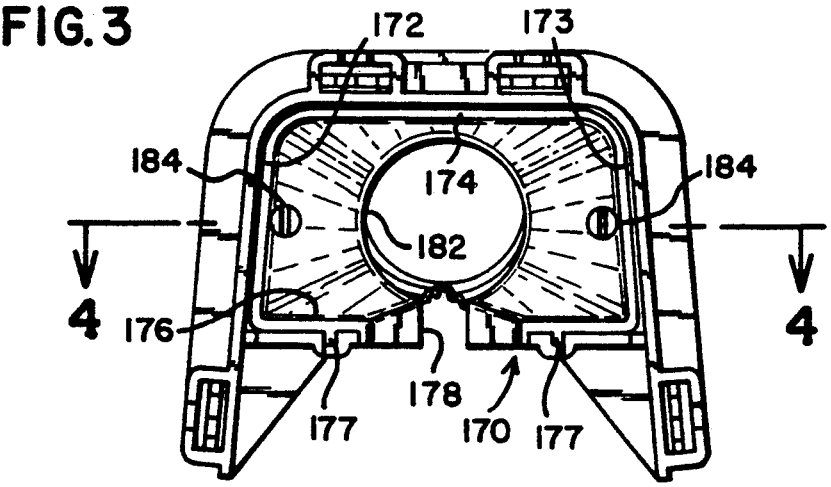
FIG. 3 is a top plan view of a portion of the union of FIG. 1 showing a transition to a flexible conduit.

Referring now to the several drawing figures in which identical elements are numbered identically throughout, an optical fiber cable routing system is disclosed. The system includes a variety of elements, including principally a plurality of identical cable troughs, a representative one of which is shown as item 10 (see FIGS. 20-24 and FIG. 1). The trough 10 carries optical fiber cables from one location to another within a structure (such as a building having optical fiber signal transmitting equipment). It is intended that the trough 10 would be suspended from a ceiling structure by any suitable means (not shown).

B. Trough Design

Shown best in FIGS. 20-24, the trough 10 is preferably formed of plastic material through an extrusion process such that the trough 10 presents the same cross-sectional profile along its entire length. As shown in the drawing, the trough 10 includes a plurality of walls including bottom wall 12 and spaced apart side walls 14. The bottom wall 12 and side walls 14 cooperate to define a trough interior 18 which is used as a cable pathway.

The side walls 14 are flared outwardly with the trough being U-shaped in cross-section. Interior 18 is exposed through an upper opening 20 extending along the upper end of the trough. The dimensions of the trough cross-section can be varied to accommodate any desired number of optical cables. Trough 10 can be extruded to any desired length ("length" being the dimension between ends 22).

C. Trough Attachment Members

The trough 10 includes a plurality of attachment members 26. Each of the attachment members is identical and extends parallel to the longitudinal axis of the trough 10. In a preferred embodiment, each of the attachment members 26 is integrally formed with the trough 10 and simultaneously extruded with the trough 10. Accordingly, each of the attachment members 26 presents an identical cross-section at any given location along the longitudinal dimension of the trough 10. The attachment members 26 are preferably disposed with one member 26 on each side wall 14 adjacent the free edge 15 of the wall, and with two attachment members 26 disposed in parallel alignment along the outer surface of the bottom wall 12.

Shown best in FIG. 24, each of the attachment members 26 includes spaced-apart side plates 28, which extend generally perpendicular to the wall of attachment (i.e., walls 14 or 12). Plates 28 terminate at inwardly-projecting flanges 32. Opposing flanges 32 are spaced apart to define a bolt shaft slot 36 sized to slidably receive the shaft of a bolt of predetermined dimension.

Spaced inwardly from flanges 32 each of side plates 28 are provided with inwardly-projecting intermediate ribs 38 (see FIG. 24). Ribs 38 are spaced apart to define a bolt head receiving slot 42, sized to receive a hexagon-shaped bolt head of known dimension with the head slidable but not rotatable with slot 42.

Opposing surfaces of plates 28, flanges 32 and ribs 38 define a plate receiving slot 44 sized to receive an elongated plate. Since attachment members 26 are extruded, each of slots 36, 42 and 44 extend the entire longitudinal dimension of the trough 10.

As will be more fully described, the slots 36, 42 and 44 are sized to receive a bolt 48 and attachment plate 50 joined by a nut 52 (see FIG. 6). As shown in FIG. 6, a hexagon-headed bolt 48 is received within an attachment member 26, with the head 54 of the bolt slidably received within bolt head receiving slot 42. Slot 42 is sized to slidably receive head 54 but prevent rotation of head 54 about its axis when received within slot 42. Slot 36 is sized to pass bolt shaft 55 so that a nut 52 can be attached external to attachment member 26.

As shown in FIGS. 1, 5 and 6, an attachment plate 50 preferably formed of steel, is provided and sized to be slidably received within slot 44. Plate 50 includes a plurality of bolt holes 56 (FIG. 1) disposed along its longitudinal axis and sized to receive shaft 55 of bolts 48.

Plate 50 is secured in place to the attachment member 26 by means of an attachment clamp 58. Shown best in FIGS. 1 and 6, clamp 58 has an inner surface shaped and formed with an outer surface of attachment member 26. The plate includes a flat surface 60 sized to abut the exterior surface of flanges 32. Curved side edges 62 are shaped to conform and abut side plates 28. Accordingly, with a nut 52 tightened onto shaft 55, the clamp 60 is drawn toward plate 50 to secure plate 50 in place, with head 54 prevented from rotation within slot 42. With this structure as described, a plurality of attachment plates 50 can be rigidly secured to each of the attachment members 26 of a trough 10 to facilitate attachment of the trough 10 to other elements of the system as will be described.

D. Fittings

1. General Fittings.

The trough 10 is preferably mounted in a building facility with its longitudinal axis extending in a generally horizontal line and with the upper opening 20 facing upwardly. However, it will be appreciated that in any given installation, the installer may position a trough 10 in any position or orientation he may desire.

While trough 10 is suitable for acting as a conduit for cables from one location to a linearly displaced location, it is desirable in an installation that a routing system would include bends and turns. To provide such flexibility to the routing system, a plurality of fittings are provided for the system.

As shown in the drawings, each of the fittings presents a cross-section which is generally identical to the cross-section of the troughs such that each of the fitting defines a cable pathway which, when connected to troughs, provides for a continuous cable pathway which includes bends, dips and turns.

The plurality of fittings include a vertical 90° elbow 70 (shown in FIGS. 25-31), having a concave upper surface with an opening 71. The elbow 70 extends between 90° displaced ends 71a, 71b defined between side walls 70a, 70b.

Fitting 70 is useful in combination with a vertical 90° elbow having a convex opening. Such an elbow is shown in FIGS. 58-64 as item 74. In item 74, the convex opening 75 is defined between side walls 74a and 74b and extend between 90° spaced apart ends 75a, 75b. In cooperation with elbow 70, elbow 74 permits a change in elevation between connected troughs. For example, a trough can be connected to end 75b of elbow 74. End 75a could then be connected directly to end 71b of elbow 70 or connected thereto to an intermediate trough 10 with a second horizontal trough connected to end 71a. With this combination, two vertically displaced horizontal troughs can be connected by elbows 70 and 74 with or without the utilization of an intermediate vertical trough.

For horizontally spaced apart but parallel aligned troughs, horizontal elbows are provided. For example, FIGS. 39-45 show an elbow 76 having an opening 77 extending between side walls 76a, 76b. The opening 77 extends from a first end 77a to a second end 77b which are displaced 90° to define a generally elbow-shaped cable pathway. For greater flexibility and to accommodate connecting troughs which are not parallel aligned, the set of fixtures also includes a 45° left-to-right elbow 80 shown in FIGS. 32-38. Elbow 80 includes a vertical opening 81 which can be defined between side walls 80a and 80b and extends between ends 81a and 81b. Ends 81a and 81b are offset 45°.

A T-fitting 84 is provided as shown in FIGS. 52-57. T-fitting 84 extends between linearly spaced apart ends 85 and 86 and has a third opening 87 at a 90° orientation with respect to the line between ends 85 and 86.

Side walls 84a, 84b and 84c and bottom wall 84d cooperate to define a T-shaped cable pathway 87 open above bottom wall 84d. T-fitting 84 is for connection to three troughs to form a T-shaped pathway. As shown in the figures, the T-fitting internal corners 85a, 86a are radiused with a minimum radius to prevent overbending of fiber optic cables. Preferably, the radius is kept to no less than 1.5 inches.

It will be appreciated by those skilled in the art that the troughs 10 can be made in a variety of sizes to handle a variety of anticipated loads of fiber optic cables. From time to time, it may be desirable to go from one size trough to another. To accommodate such cases, a reducing fitting 90 is provided, extending from an enlarged first end 91 to a smaller second end 92 (see FIGS. 46-51). Fitting 90 has narrowing side walls 90a, 90b and bottom wall 90e cooperating to define a narrowing cable pathway open above bottom wall 90c.

Using troughs 10 and the plurality of fixtures, a system designer and installer can produce a cable routing system having a plurality of bends, dips and intersections to accommodate a wide variety of installation designs. The extruded troughs 10 can be as long as desired and spliced together directly or with fixtures.

2. Take-off Union.

From time to time, it will be desirable to add a take-off union 100 in order to selectively remove one or more cables from the trough and direct the removed cable to a piece of fiber optic equipment within the installation. In the anticipated installation where the cable routing system is applied overhead, the take-off union 100 permits cables to be routed from the overhead troughs 10 and vertically downward through a flexible conduit 130 to a piece of fiber optic equipment (not shown).

Figure 4:
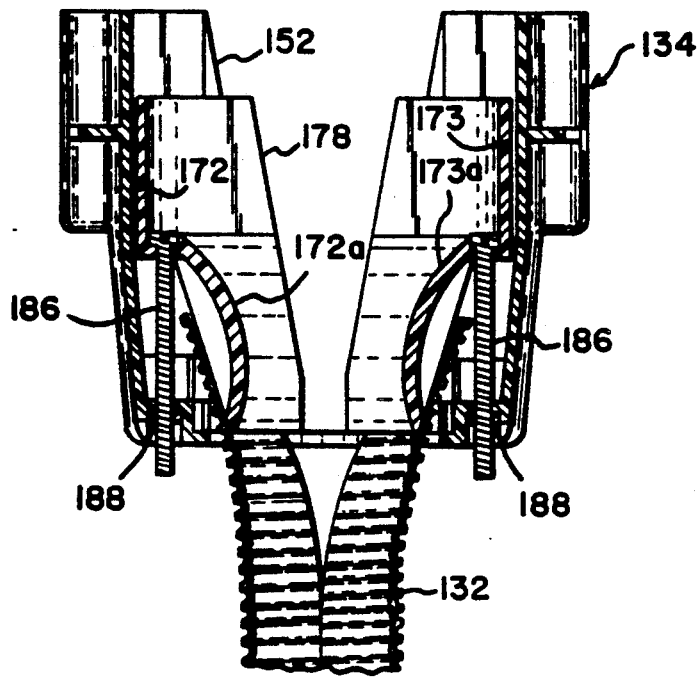
FIG. 4 is a view taken along line 4—4 of FIG. 3.

The take-off union 100 is shown assembled in FIG. 1 and includes a main body 112 (FIG. 8), an adaptor body 134 (FIG. 14) and a transition collar 170 (FIG. 4).

Main body 112 (FIGS. 8-13) includes a bottom wall 118 extending between linearly spaced apart ends 113, 114. A back wall 116 extends upwardly and slightly outwardly from bottom wall 118. Spaced from back wall 116 are two side wall portions 120a and 120b.

Figure 11:
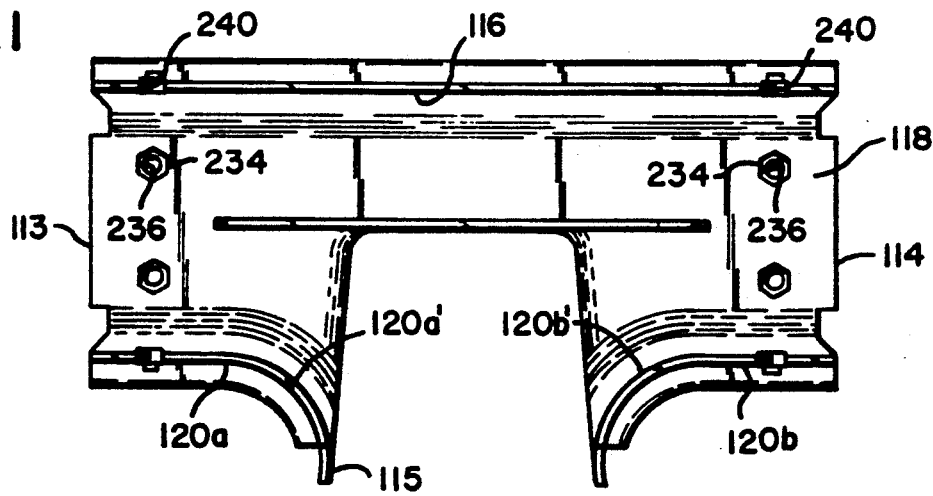
FIG. 11 is a top plan view of the take-off union main body of FIG. 8.

Shown best in FIG. 11, side wall portions 120a, 120b extend from ends 113, 114 in a path generally parallel to back wall 116, but then curve and flare outwardly as the side walls approach one another. The side walls curve generally perpendicularly away from back wall 116 and are spaced apart to define a generally vertical opening 115. Each of side walls 120a, 120b present radiuses of curvature 120a', 120b', which are selected to present a radius of curvature of not less than 1.5 inches to protect optical fibers from overbending.

Bottom wall 118 is solid from end 113 to end 114 only along the half of the bottom wall 118 adjacent back wall 116. A vertical median plate 117 is provided generally parallel to back wall 116 and situated between wall 116 and walls 120a, 120b. Near the center of the longitudinal dimension between ends 113, 114, bottom wall 118 flares downwardly to present downwardly extending bottom wall portions 118a and 118b, which extend downwardly generally perpendicular to bottom wall 118.

Figure 12:
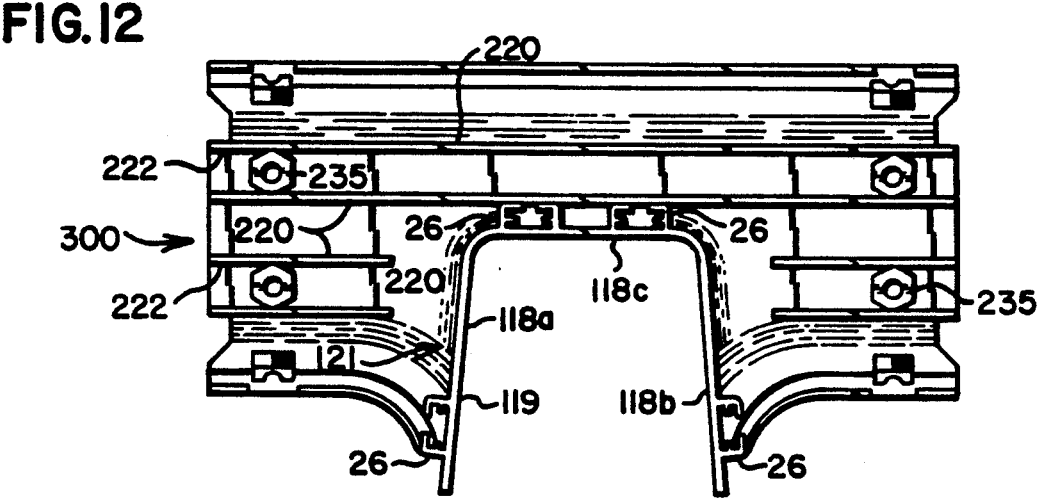
FIG. 12 is a bottom plan view of the take-off union main body of FIG. 8.
Figure 13:
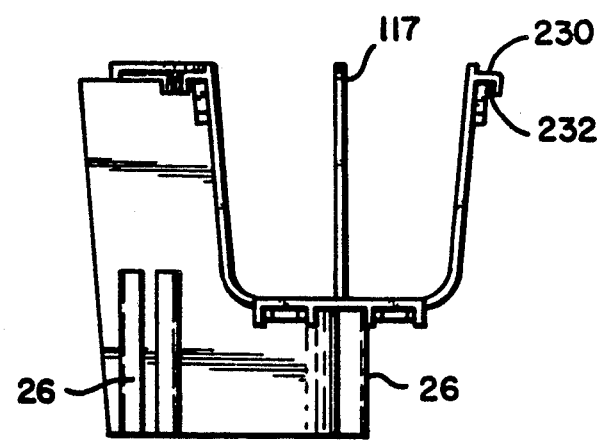
FIG. 13 is a right side elevation view of the take-off union main body of FIG. 8, with the opposite side being substantially identical.

Wall portions 118a, 118b define a downwardly extending opening 119 which is generally U-shaped and conforms in cross-sectional configuration with ends 113, 114 (as best shown in FIG. 12). Downwardly extending bottom wall portions 118a, 118b are provided with a radius of curvature (best shown in FIG. 9) which is selected to be not less than 1.5 inches to prevent overbending of optical fibers.

As a result, main body 112 presents a downwardly extending trough-like portion 121 having attachment members 26 extending generally vertical on the outer surfaces of trough-like portion 121. These attachment members 26 are the same in function and structure to those on the trough 10 as previously described.

The adaptor body 134 is selected for attachment to trough-like portion 121. The adaptor body is shown separately in FIGS. 14-19 and also in FIGS. 1 and 2 as attached to the main body 112. As will become apparent, the adaptor body 134 provides for a transition between the main body 112 and the flexible conduit 130.

Shown in FIGS. 14-19, the adaptor body 134 has three side walls 136, 137, 138 which define a U-shaped chamber 140. The walls 136, 137, 138 are selected to align with walls 118a, 118b, 118c of trough portion 121. Also, walls 136, 137, 138 are provided with attachment channels 126' disposed to align with attachment members 26 on T-union main body 112.

Adaptor body 134 is secured to T-union main body 112 by means of metal mounting plates 50 (identical to those attached to troughs 10) received within aligned channels 126', 26. The plate 50 is secured to the attachment member 26 by clamp 62 and bolt 48 identical to that described with respect to trough 10 (see FIG. 6). The plate 50 is secured to channel 126' by a bolt 48 slidably but not rotatably received within channel 126'.

A coupling 250 aligns adaptor body 134 with T-union main body 112. Couplings 250 (and retaining clips 200) are described with greater particularity in the following section entitled "Attachment of Fixture to Troughs". The same design coupling 250 is used to attach fixtures to troughs and to attach fixtures to one another.

Figure 14:
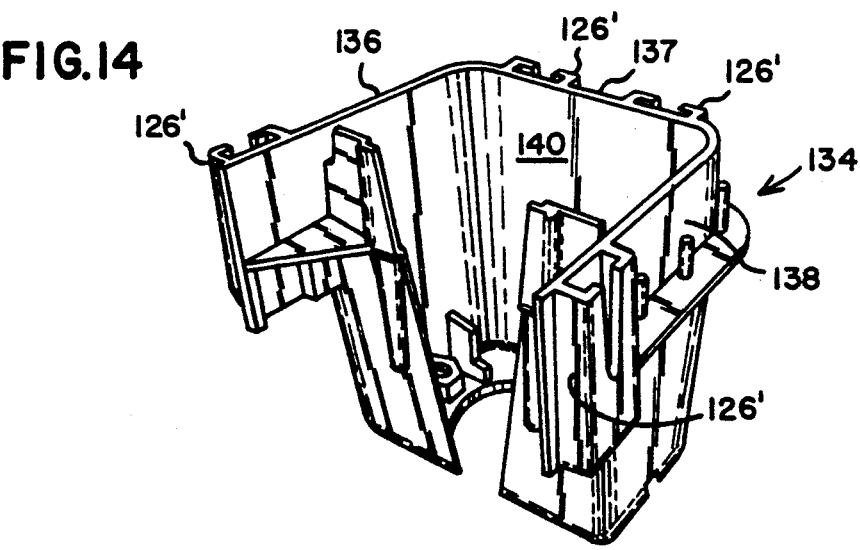
FIG. 14 is a front, right side and top perspective view of an adaptor body for the take-off union of the present invention.
Figure 15:
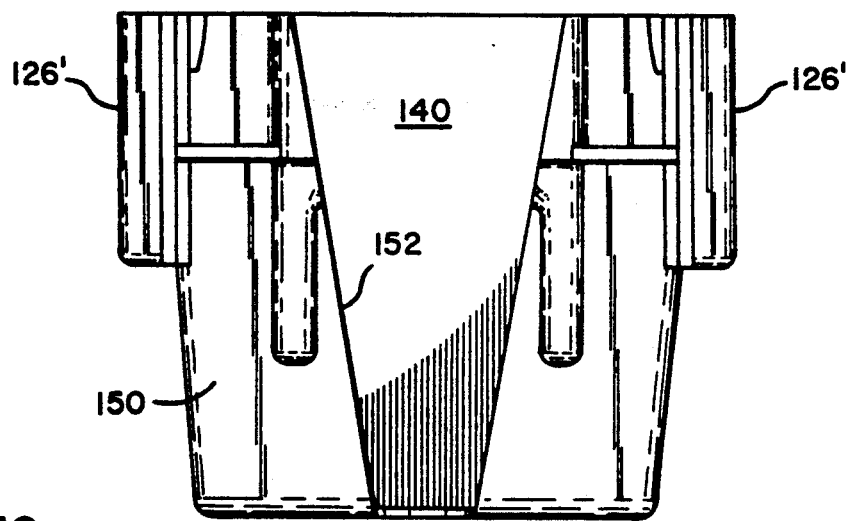
FIG. 15 is a front elevation view of the adaptor body of FIG. 14.
Figure 16:
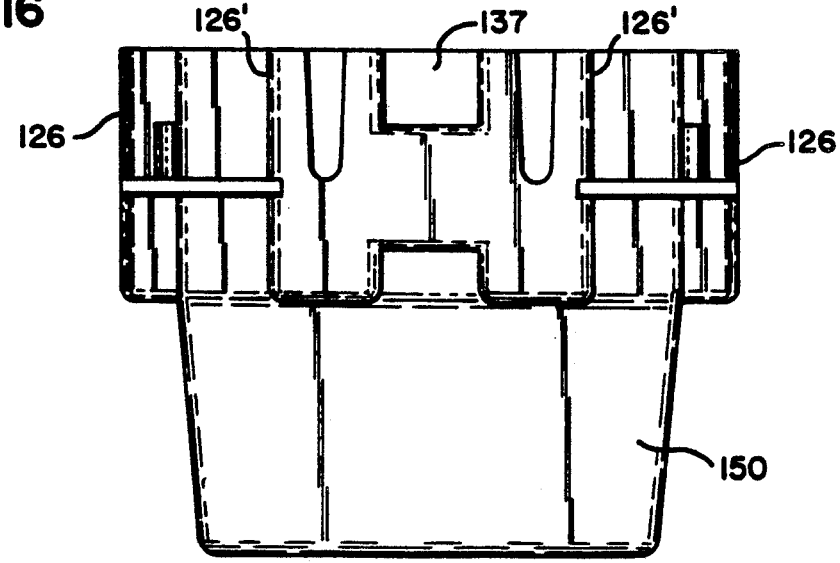
FIG. 16 is a rear elevation view of the adaptor body of FIG. 14.
Figure 17:
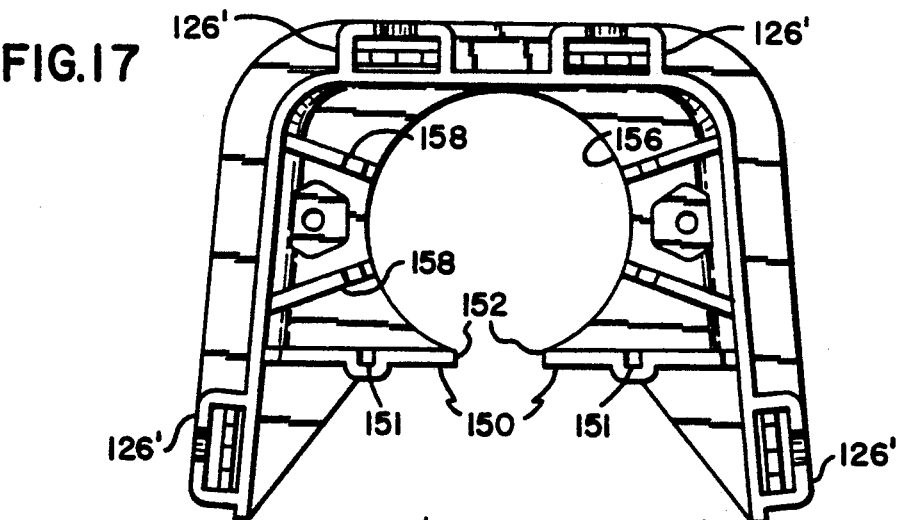
FIG. 17 is a top plan view of the adaptor body of FIG. 14.
Figure 18:
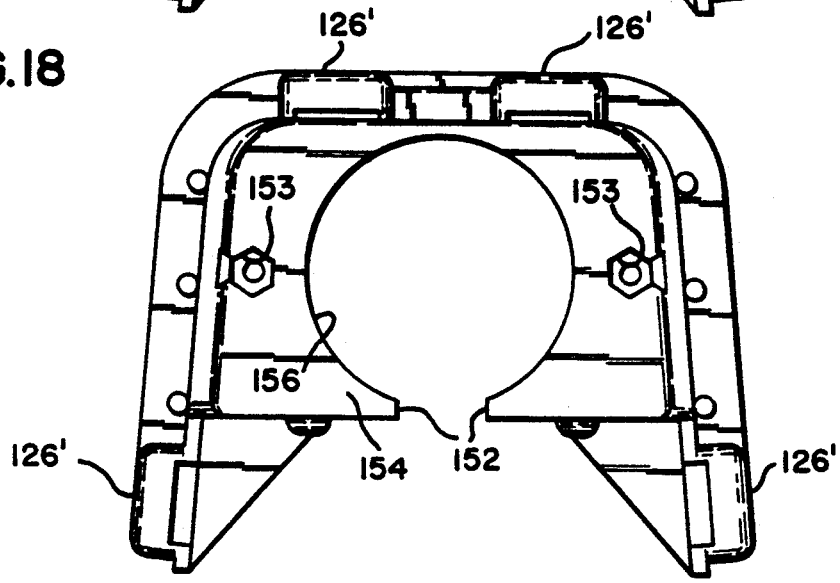
FIG. 18 is a bottom plan view of the adaptor body of FIG. 14.
Figure 19:
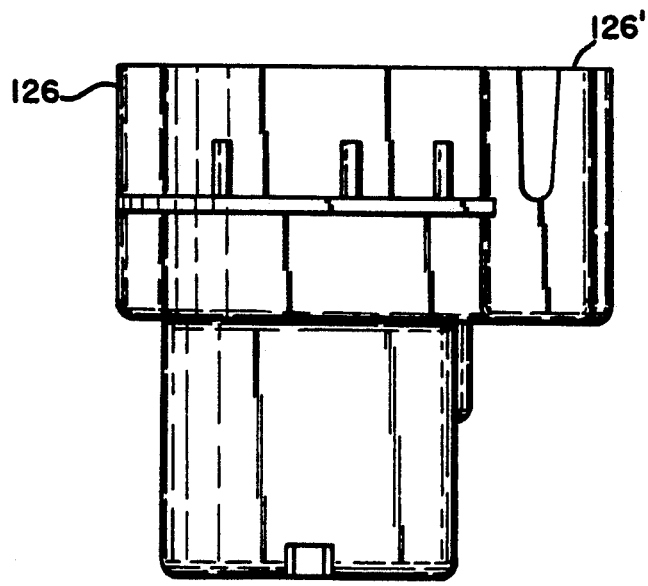
FIG. 19 is a right side elevation view of the adaptor body of FIG. 14 with the opposite side being substantially identical.
Figure 25:
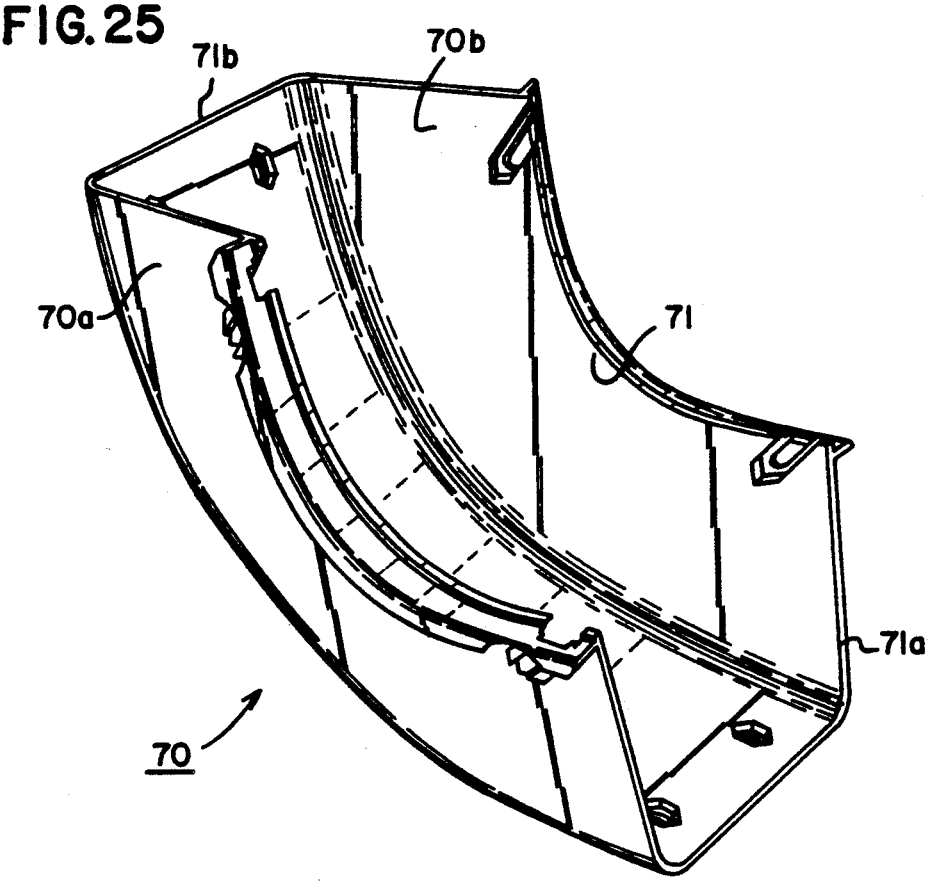
FIG. 25 is a top, front and left side perspective view of concave open 90° elbow for use with the present invention.
Figure 26:
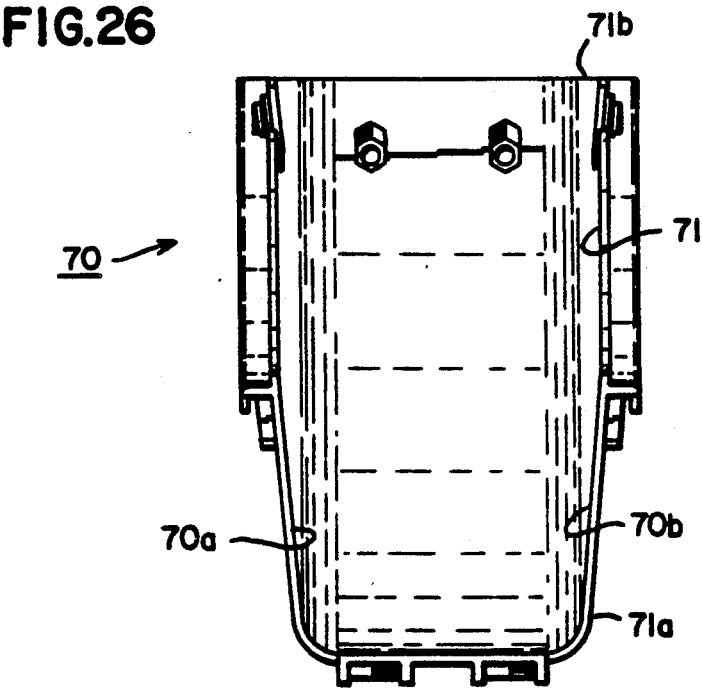
FIG. 26 is a front elevation view of the elbow of FIG. 25.
Figure 27:
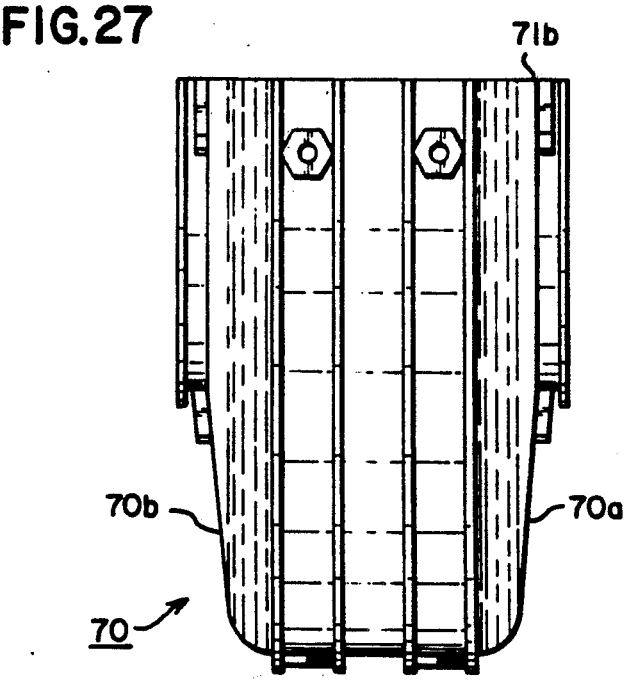
FIG. 27 is a rear elevation view of the elbow of FIG. 25.
Figure 28:
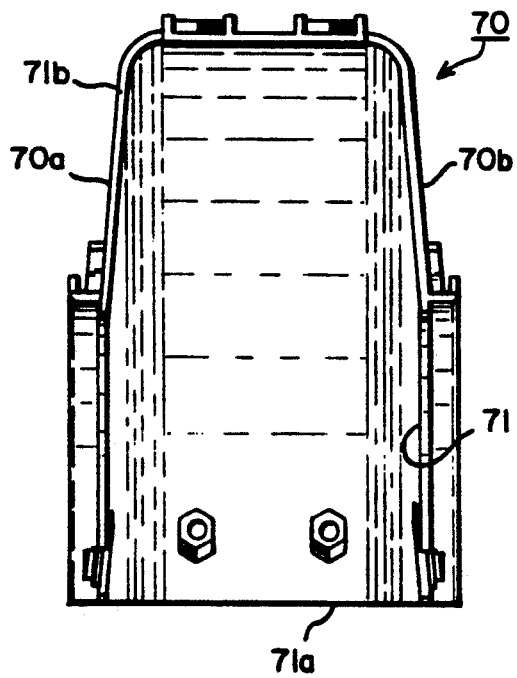
FIG. 28 is a top plan view of the elbow of FIG. 25.
Figure 29:
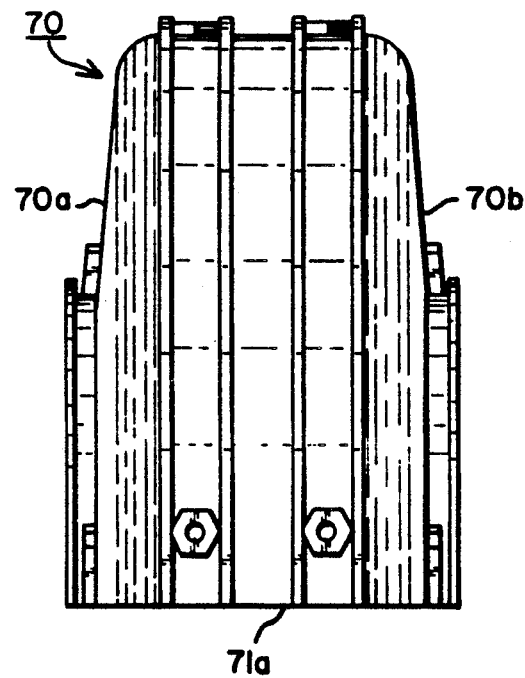
FIG. 29 is a bottom plan view of the elbow of FIG. 25.
Figure 32:
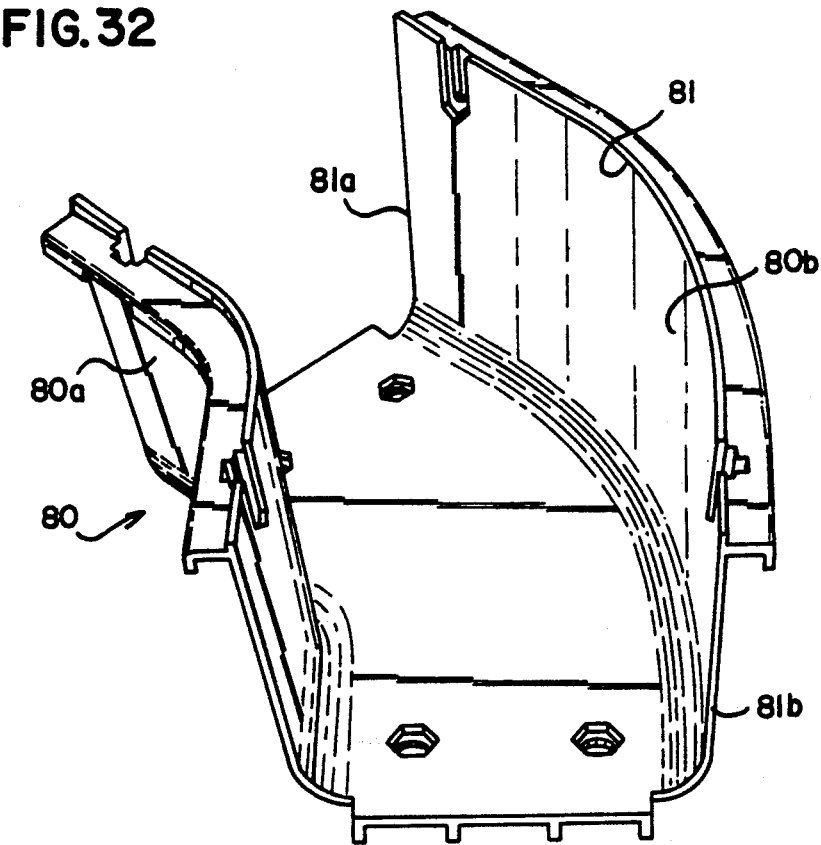
FIG. 32 is a top, front and left side perspective view of a 45° horizontal elbow for use with the present invention.
Figure 33:
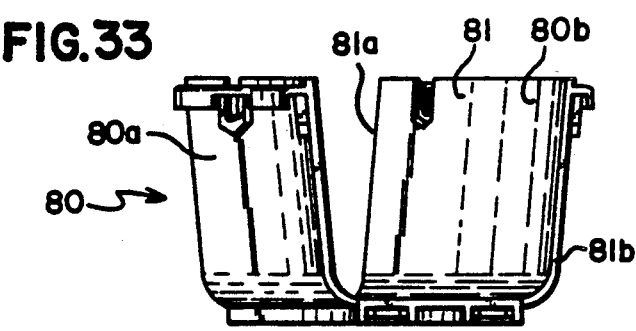
FIG. 33 is a front elevation view of the elbow of FIG. 32.
Figure 34:
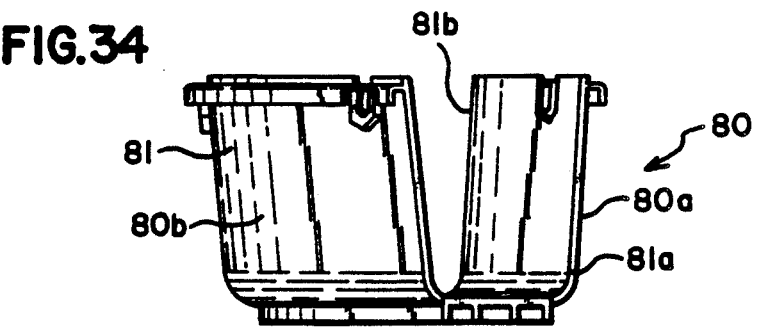
FIG. 34 is a back elevation view of the elbow of FIG. 32.
Figure 35:
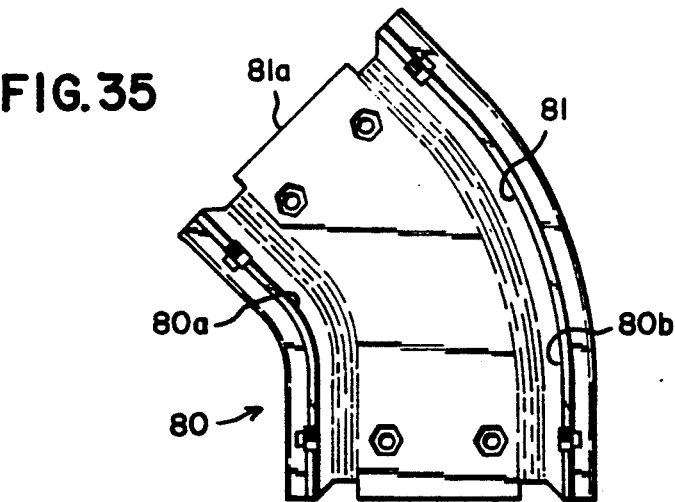
FIG. 35 is a top plan view of the elbow of FIG. 32.
Figure 36:
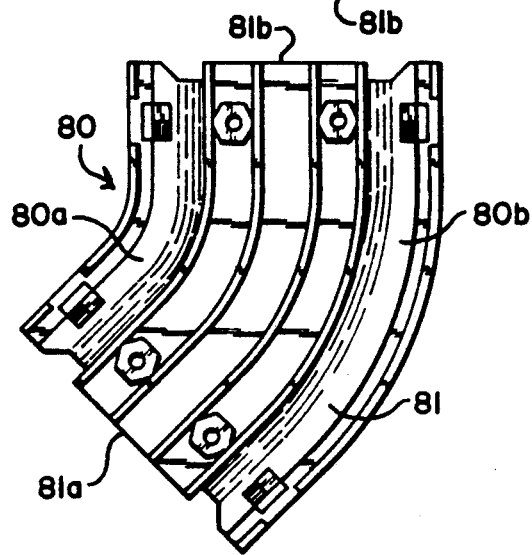
FIG. 36 is a bottom plan view of the elbow of FIG. 32.
Figure 37:
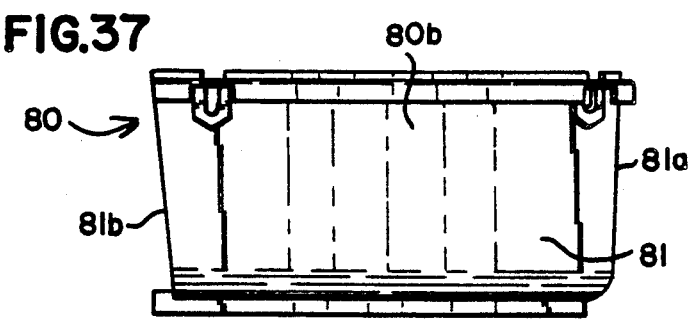
FIG. 37 is a right side elevation view of the elbow of FIG. 32.
Figure 38:
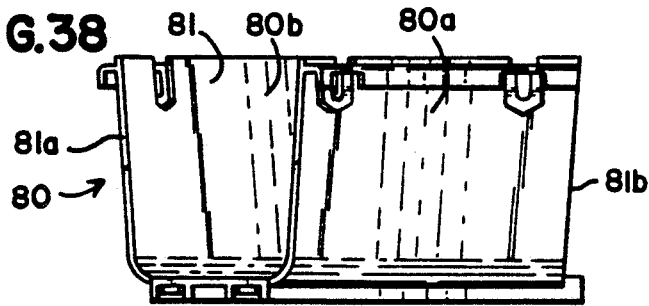
FIG. 38 is a left side elevation view of the elbow of FIG. 32.
Figure 39:
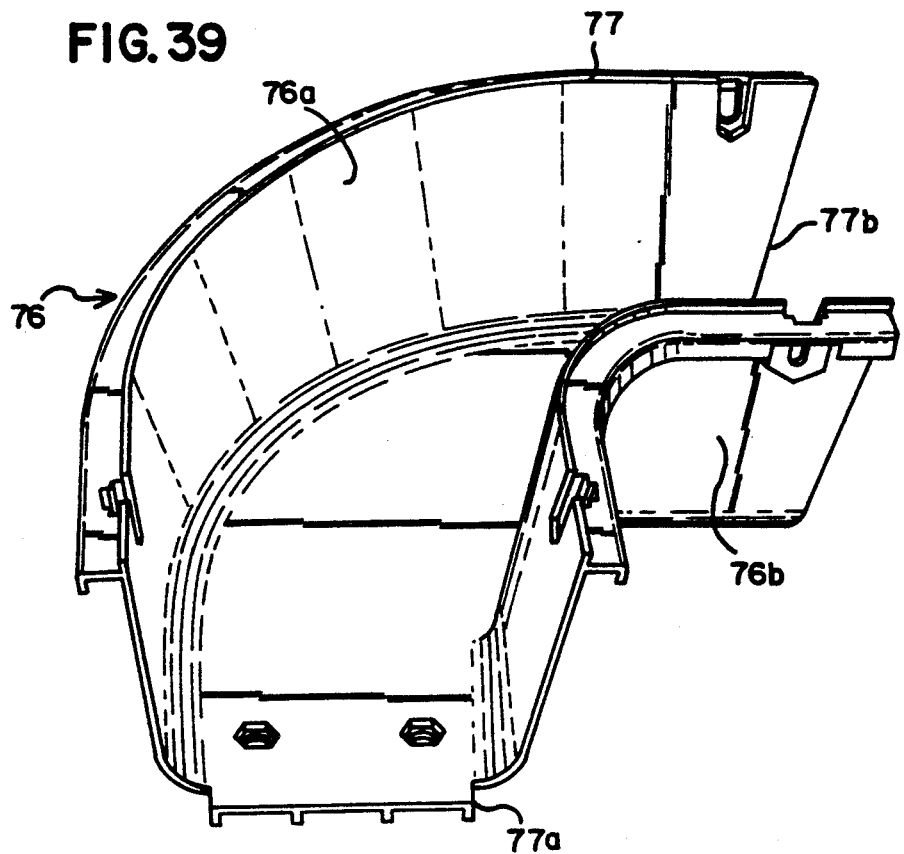
FIG. 39 is a top, front and right side perspective view of a 90° horizontal elbow for use with the present invention.
Figure 40:
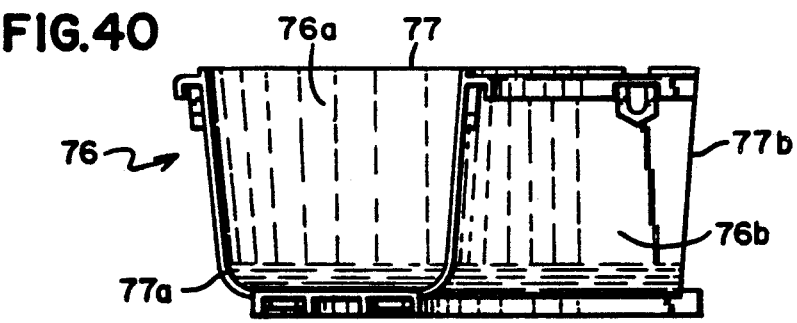
FIG. 40 is a front elevation view of the elbow of FIG. 39.
Figure 41:
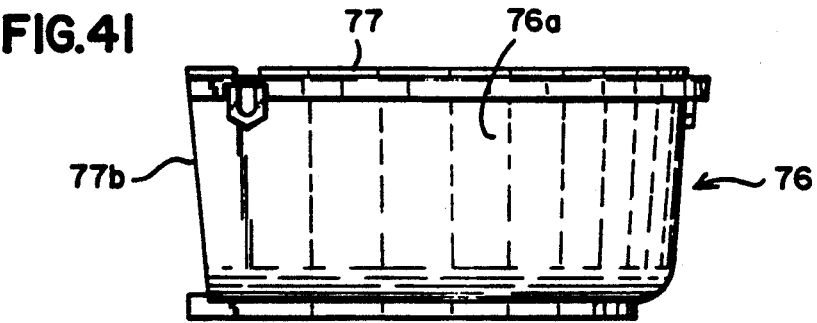
FIG. 41 is a back side elevation of the elbow of FIG. 39.
Figure 46:
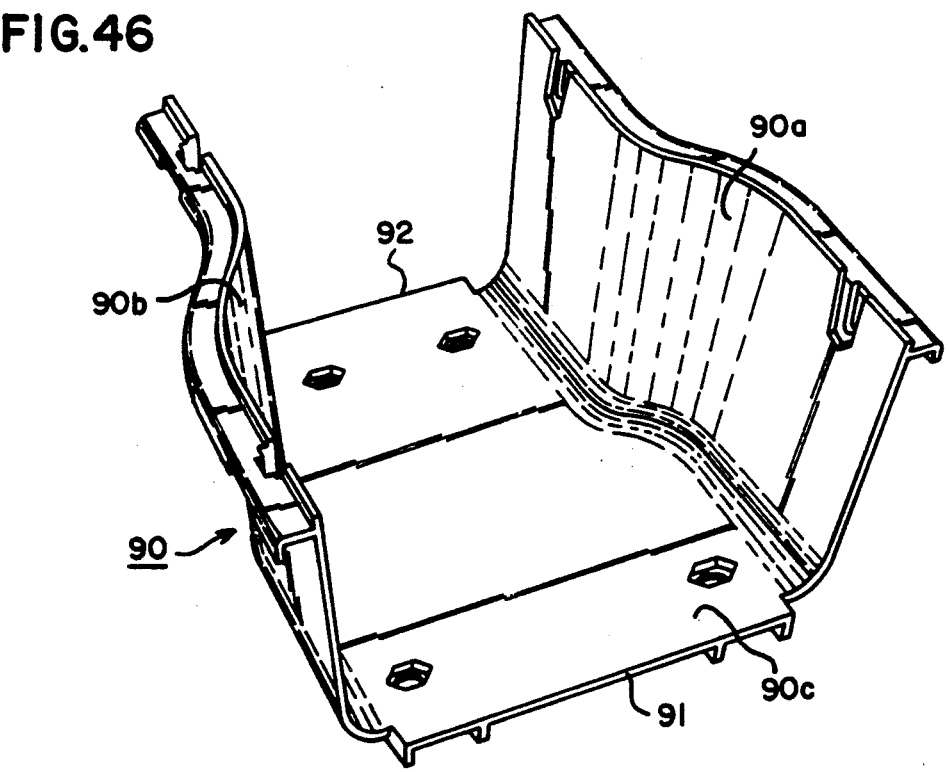
FIG. 46 is a top, front and left side perspective view of a reducing fitting for use with the present invention.
Figure 47:
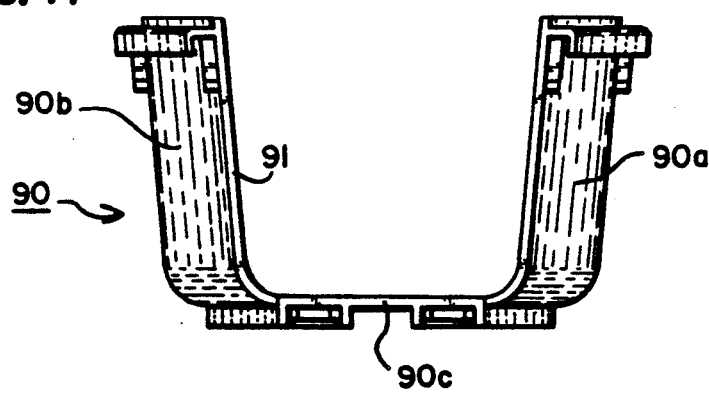
FIG. 47 is a back side elevation view of the fitting of FIG. 46.
Figure 48:
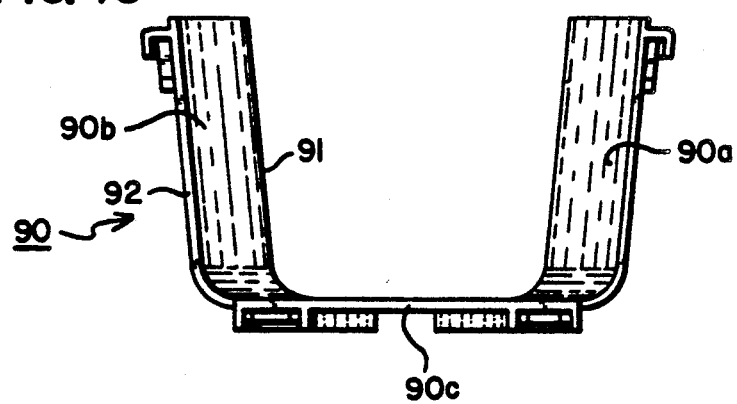
FIG. 48 is a front side elevation view of the fitting of FIG. 46.
Figure 49:
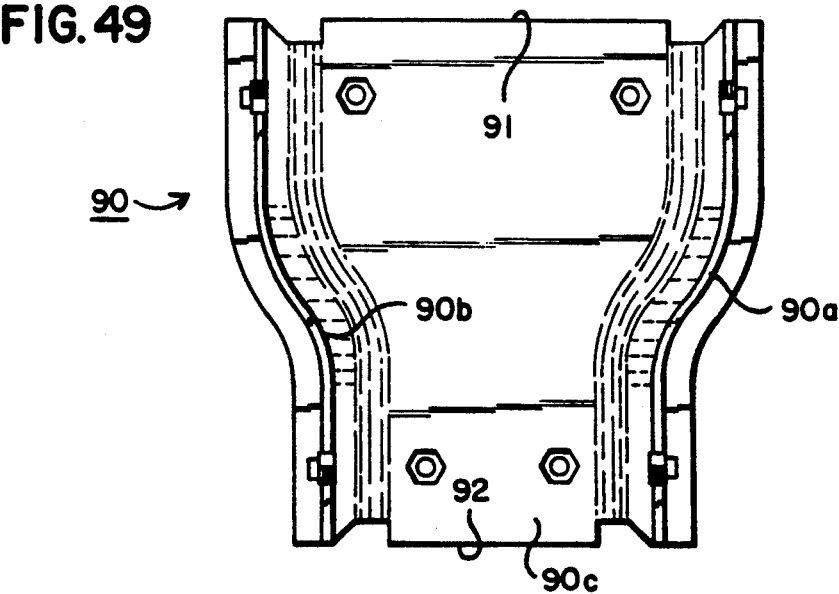
FIG. 49 is a top plan view of the fitting of FIG. 46.
Figure 50:
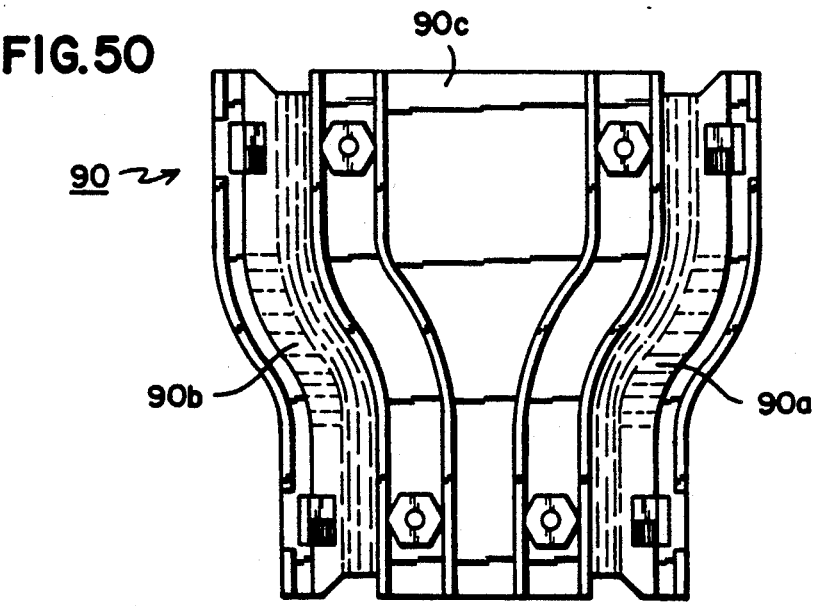
FIG. 50 is a bottom plan view of the fitting of FIG. 46.
Figure 51:
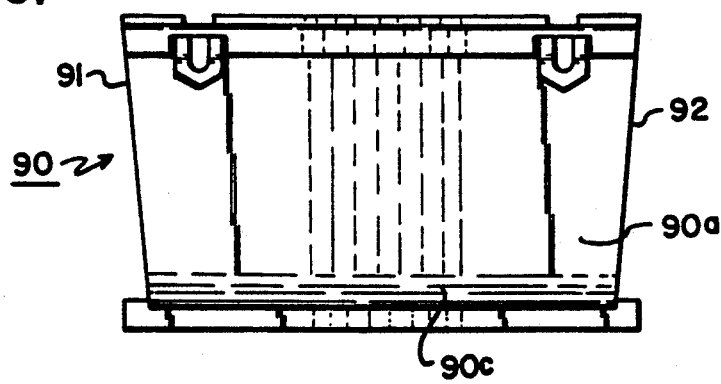
FIG. 51 is a right side elevation view of the fitting of FIG. 46, with the opposite side being substantially identical thereto.
Figure 52:
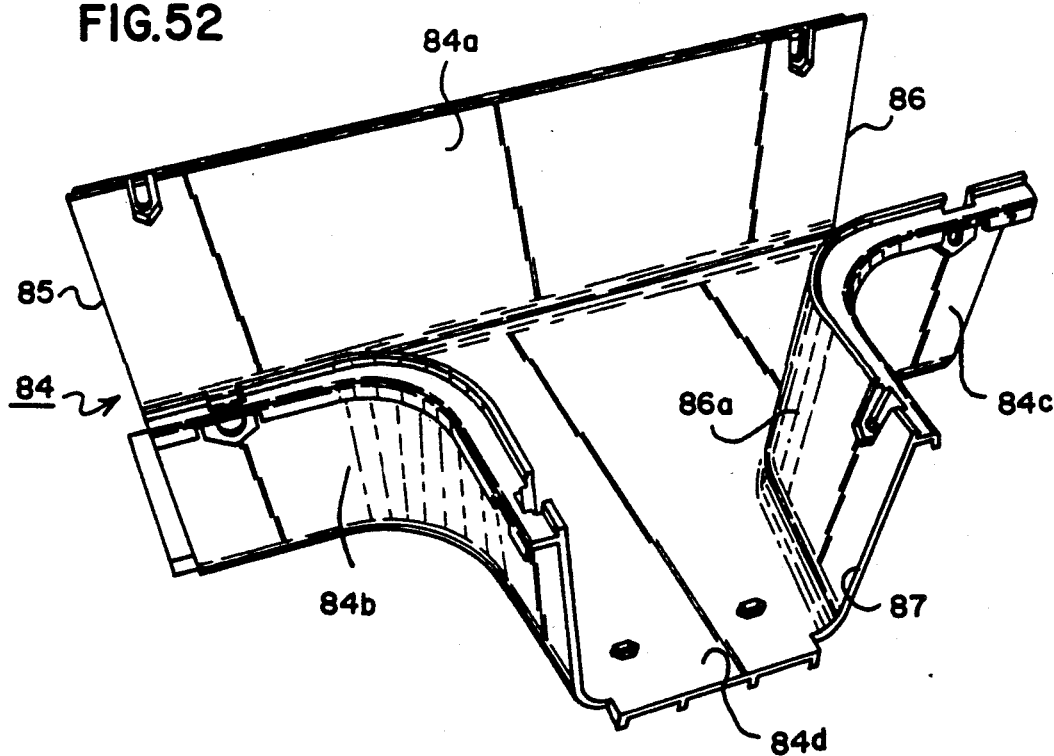
FIG. 52 is a top, front and left side perspective view of a T-fitting for use with the present invention.
Figure 53:
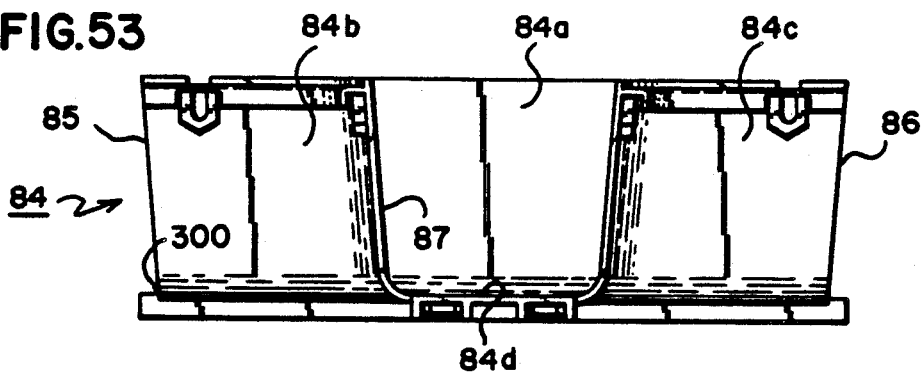
FIG. 53 is a front elevation view of the T-fitting of FIG. 52.
Figure 54:
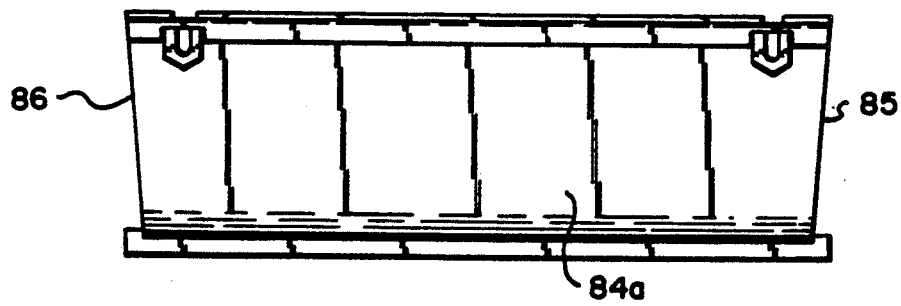
FIG. 54 is a back side elevation view of the T-fitting of FIG. 52.
Figure 55:
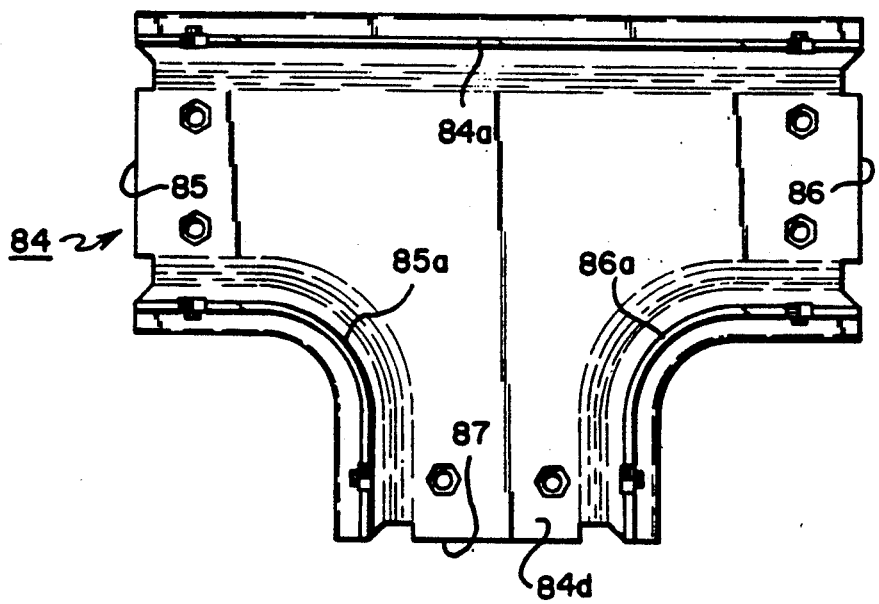
FIG. 55 is a top plan view of the T-fitting of FIG. 52.
Figure 56:
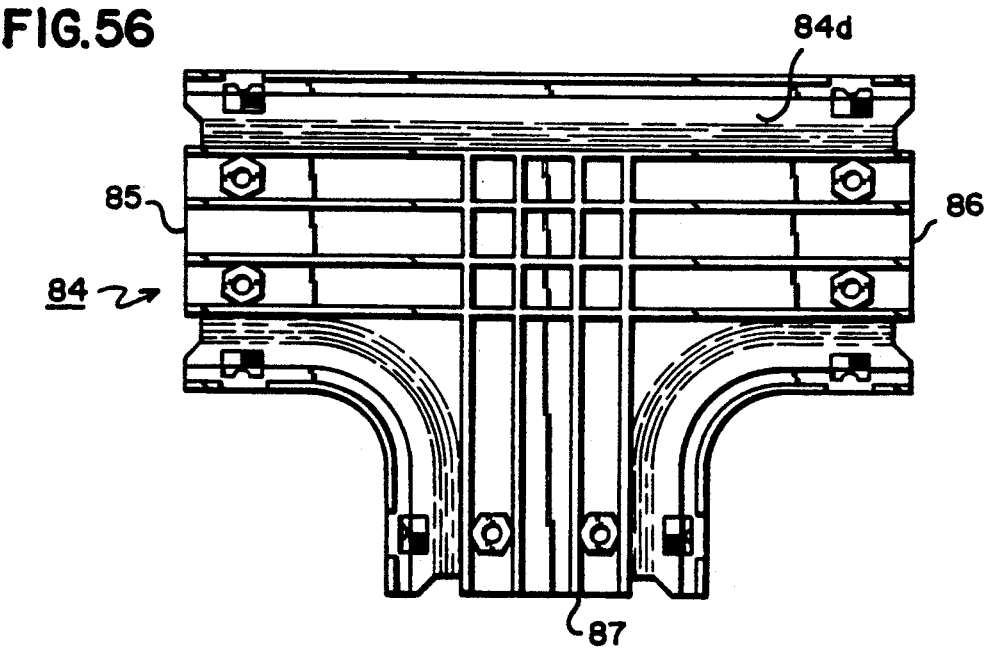
FIG. 56 is a bottom plan view of the T-fitting of FIG. 52.
Figure 57:
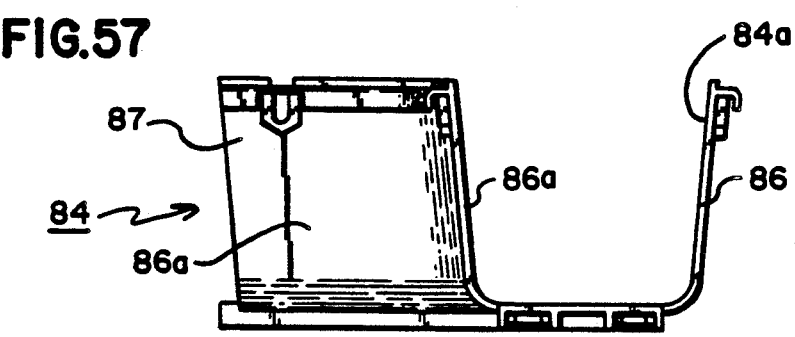
FIG. 57 is a right side elevation view of the T-fitting of FIG. 52, with the opposite side being substantially identical thereto.
Figure 58:
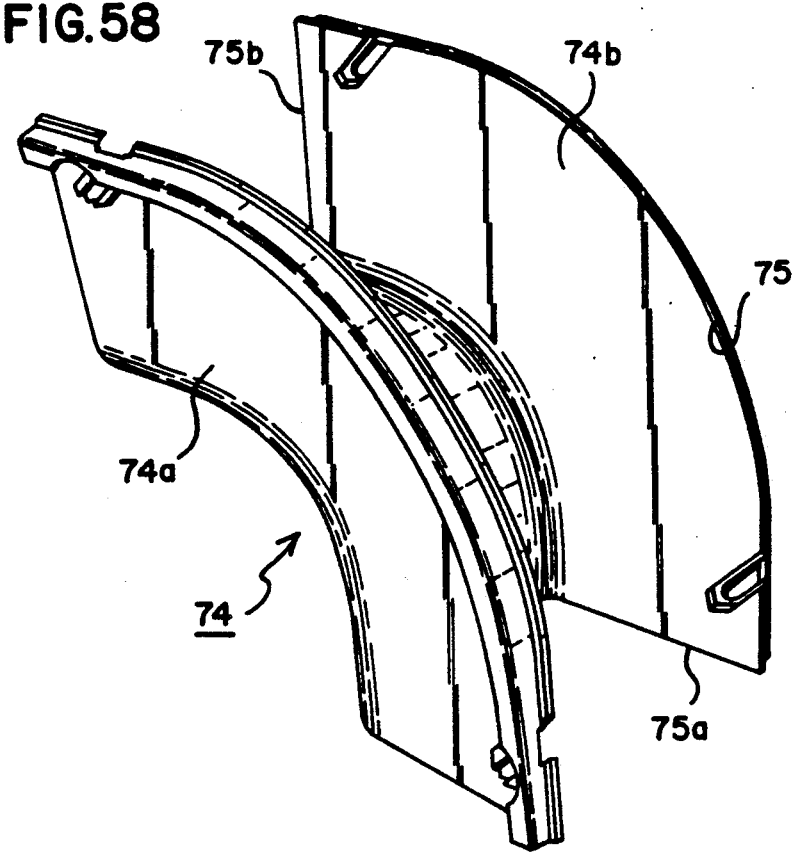
FIG. 58 is a perspective view of a vertical convex opening 90° elbow for use with the present invention.
Figure 59:
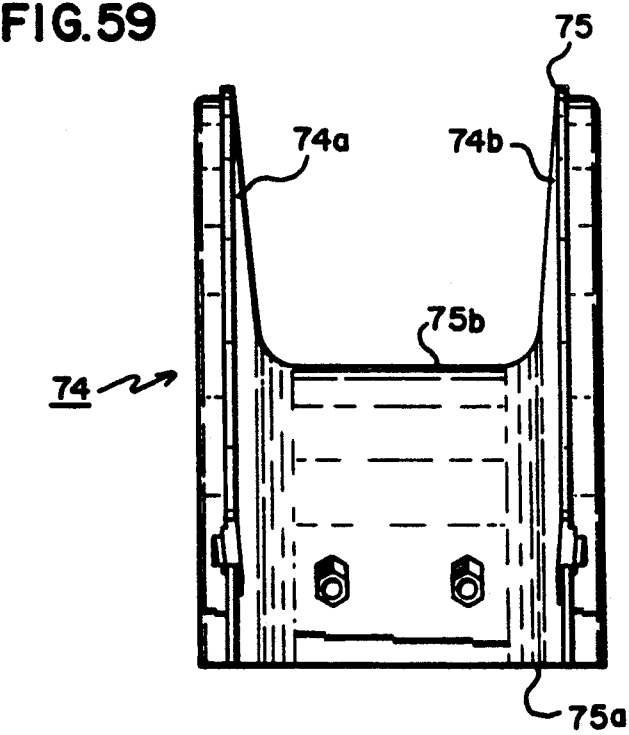
FIG. 59 is a front elevation view of the elbow of FIG. 58.
Figure 60:
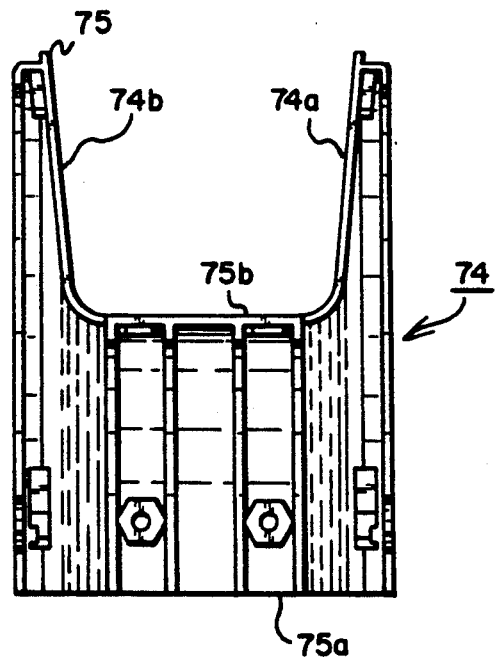
FIG. 60 is a back side elevation view of the elbow of FIG. 58.
Figure 61:
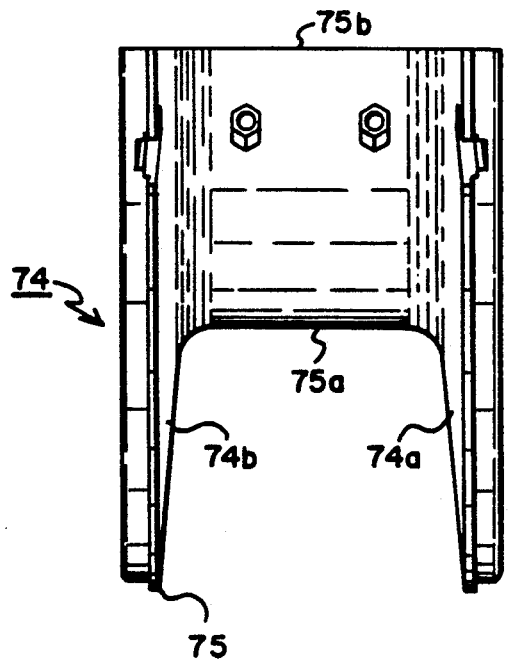
FIG. 61 is a top plan view of the elbow of FIG. 58.
Figure 62:
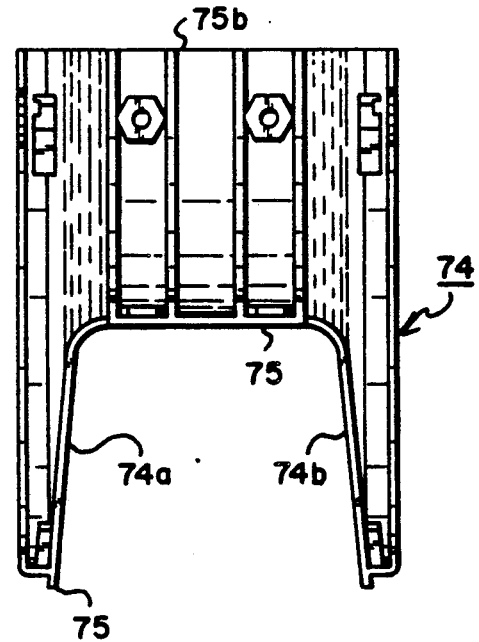
FIG. 62 is a bottom plan view of the elbow of FIG. 58.

Shown best in FIGS. 14, 15 and 17, the adaptor body has a forward wall 150 facing wall 137 and provided with a V-shaped groove 152 extending therethrough to expose interior 140. The adaptor body 134 also includes a bottom plate 154 (see FIG. 18) having a central hole 156 sized to receive a flexible conduit 130.

Within interior 140 of adaptor body 134 are four generally vertical plates 158 connecting bottom wall 154 with side walls 136, 138. The vertical plates 158 are notched, with the plates 158 acting as stepped ribs.

On walls 150 on each side of V-shaped groove 152 are vertical grooves 151. Finally, on bottom wall 154, hexagon-shaped recesses 153 are provided for receiving hexagon-shaped nuts for the purposes that will be described.

A transition collar 170 is provided sized to be received within adaptor body 134. FIGS. 3 and 4 show collar 170 so received. Collar 170 includes side walls 172, 173, back wall 174 and front wall 176. Front wall 176 is provided with V-shaped slot 178 formed therethrough.

As shown best in FIG. 4, side walls 172, 173 are provided with radius portions 172a, 173a. Walls 172a, 173a and 174 terminate at a circular opening 182.

The forward wall 176 has vertical outwardly projecting guide rails 177. Rails 177 are slidably received within the vertical slots 151 of adaptor body 134.

Rails 177 properly align the collar 170 within transition body 134. When so aligned, the transition collar 170 includes screw holes 184 aligned with recesses 153 for a screw 186 to extend through both collar 170 and body 134 and be threadably received on a nut 188. Accordingly, by turning screw 186, the collar 170 is urged downwardly into body 134 when viewed in FIG. 4.

Best shown in FIGS. 1 and 4, the flexible conduit 130 is provided with an axial slit 132. Also, conduit 130 is provided with circumferential outer ribbing 130a. To assemble the collar 170, adaptor body 134 and conduit 130, the end of the conduit 130 is flared open to separate slit 132. The end of the conduit 130 is inserted into hole 156 of adaptor body 134 and the transition collar 170 is forced into the interior of conduit 130 to thereby separate the slit 132. Screws 186 are then passed through holes 184 and into the recesses 153 through threadably received nut 188. As the transition collar 170 is urged downward within adaptor body 134, the ribs on side walls 172, 173 urge the ribbed conduit 130 against the stepped ribs 158 to securely capture the flexible conduit 130 within the now-combined adaptor body 134 and transition collar 170. With the conduit 130 attached to the adaptor body 134, the body 134 is then attached to the take-off union main body 112 as shown in FIG. 1 to form a completed take-off union 100.

To prevent cables from inadvertently falling out of the vertical slots 178 and 152, a retaining clip 200 is provided having a first end 200a pivotally secured to a pin 251 on one side of the coupling 250, and a second end 200b releasably secured to a pin 251a on an opposite side of the coupling 250. As a result, retaining clip 200 may be pivoted to the position shown in phantom lines in FIG. 2 whereby cables can be placed in or out of the slots 152, 178 as desired.

E. Attachment of Fixtures to Troughs

Each of the fittings 70, 74, 76, 84, 90, 100, 112, 80 may be attached to the end of the trough 10 or to each other. To facilitate attachment, each end of the fittings 70, 74, 76, 84, 90, 80, 112, 100 is provided with an attachment configuration. Each such attachment configuration is identical and the description of the attachment configurations of the body 112 (described below) will suffice as the descriptions of the attachment configurations of all fittings.

With reference to FIGS. 1, 8, and 11-13, the bottom wall 118 is provided with ribs 220 which define channels 222 sized to slidably receive a plate 50 and be aligned with grooves 44 of the attachment members 26 on the bottom wall 12 of trough 10. Similarly, the side walls 116, 120a and 120b are provided with tracks 230 defining grooves 232 sized to receive a plate 50, with the grooves 232 being aligned with the grooves of the attachment members 26 on the sides of a trough 10. When the channels 222 of a fixture are aligned with the grooves 44 of the trough 10, the cable pathway of the trough is aligned with the cable pathway of the fixture.

The bottom wall 118 is provided with hexagon-shaped recesses 234 sized to receive the hexagon-shaped heads of bolts, with the shafts of the bolts passing through holes 236 formed through base 118 (see FIG.

11). Also, bottom wall 118 has raised areas 235 at holes 236. A plate 50 abuts raised area 235 when received within channel 222.

Side walls 116, 120a and 120b are provided with vertical slots 240 at their upper edges, with the slots terminating at V-shaped grooves 242 (see FIG. 11) sized to receive the head of a hexagon bolt and prevent the bolt from rotating.

A coupling collar 250 is provided for aligning the ends of a trough 10 with the ends of a fixture. The collar 250 includes a centrally-located, radially-extending reinforcing rib 252. The collar is generally symmetrical about rib 252, with each side presenting a pair of U-shaped flanges 254, 256 spaced apart to define a U-shaped groove 258 sized to receive the ends of the bottom and side walls 12, 14 of a trough 10 or the aligned ends and side walls of any of the fittings. As shown in FIG. 7, flange 256 is provided with gaps 260 sized to receive attachment members 26 or ribs 220.

A fixture is attached to a trough 10 by first attaching plates 50 to the trough as previously described. Each of the plates 50 are slid within the attachment members 26 and secured in place by the bolts 48, nuts 52 and clamps 58 as shown in FIGS. 1 and 6. A coupling 250 is placed onto the trough end with the plates passing through a slot formed in the coupling. The fixture end is then slid into the opposite side of the coupling 250, with the plates 50 sliding into grooves 232 and channels 222 of the fitting. With the plates 50 so received, the plates are rigidly secured to the bottom wall of the fitting (such as wall 118) by passing hexagon nuts through holes 236. The heads of the nuts are received within the complementary recesses 234 to prevent rotation of the bolts. A bolt is then rigidly secured to plate 50 by nuts.

The side walls of the fittings are rigidly connected to the plates 50 by passing a bolt shaft through slots 240 with the head of the hexagon bolts received within grooves 242 to prevent rotation of the bolts 348. An operator turns nuts 352 to rigidly connect the bolts to the plates. So completed, a rigid connection is made between the trough and the fixture.

As shown in the drawings, each of the fixture ends includes the same attachment configuration, with each such fixture being connected to a trough in the manner described. Certain fixtures have recessed side walls at the attachment ends (see, e.g., recess 300 in side wall 84b, FIG. 53). The recess 300 results from manufacture of the part. As long as coupling 250 is made sufficiently wide, coupling 250 covers the recess 300 to present a continuous cable supporting surface.

The coupling 250 includes a retaining clip 200 (identical to the retaining clip 200 shown in FIG. 2). Clip 200 is pivotally mounted to pin 251 and releasably connected to an opposing pin 251a in order to span the trough and retain cables within the trough.

With the benefit of the present application, one skilled in the art will appreciate the benefits of the present structure in a fiber optic routing system.

Each trough is extruded and may be cut to any desired length. No matter where on the trough the cut is made, the trough presents the same configuration suitable for attachment to any of the fixtures as well as splicing to other troughs. Thus, any of the fixtures can be separated and connected by a trough of any given length. As a result, an installer can design a near infinite variation of pathways and routing systems with the use of the present invention. The troughs of the present invention and their fixtures prevent damage to the cables carried by the troughs. The internal radiuses of the troughs and fixtures establish a safe minimum bending of the fiber optic cables.

From the foregoing detailed description of the present invention, it has been shown how the objects of the invention have been obtained in a preferred manner. However, modifications and equivalents of the disclosed concepts, such as those that readily occur to one skilled in the art, are intended to be included within the scope of this invention.

What is claimed is:

1. A cable routing system comprising:
   a plurality of troughs having a plurality of walls, cooperating to define a cable pathway;
   said trough having at least one attachment member secured to at least one of said plurality of walls;
   said attachment member having cooperating surfaces sized to receive a mounting bracket of predetermined dimensions;
   said attachment member extending along the length of said wall, with said member selected to present said cooperating surfaces at any one of a plurality of locations along a longitudinal dimension of said wall;
   a take-off union having a main body portion with first wall means defining a body cable pathway extending between first and second body ends;
   attachment means for attaching said body ends to said trough, with said body cable pathway connecting a cable pathway of said trough,
   said main body having second wall means defining an outlet in communication with said body cable pathway;
   a flexible conduit having at least a first free end;
   attaching means for attaching said first free end to said outlet, with said conduit disposed to receive a cable, said attaching means including inner wall means opposing said second wall means, said conduit disposed with said first free end between said inner and second wall means with an exterior of said conduit opposing said second wall means and with said inner wall means opposing an interior of said conduit, means for urging said inner wall means toward said second wall means whereby said conduit is captures between said inner and second wall means.

2. A cable routing system according to claim 1, wherein said mounting bracket includes a plate and a clamp,
   said surfaces selected to define a groove to slidably receive said plate within said attachment member;
   said clamp sized to oppose said plate and abut an exterior surface of said member;
   bolt means for connecting said clamp to said plate with said exterior surface captured between said clamp and plate.

3. A cable routing system according to claim 2, wherein said attachment member is a channel formed in said surface having exterior surfaces defining a first slot sized to slidably receive said plate.

4. A cable routing system according to claim 3, wherein said connecting means includes a threaded bolt having a head end;
   said cooperating surfaces defining a slot sized to slidably receive said head end while preventing rotation of said head end;

said bolt sized to extend from said head end through aligned holes in said plate and clamp and receiving a threaded nut holding said plate to said clamp.

5. A cable routing system according to claim 2, comprising a coupling for joining said trough to a fixture, said coupling having a body with opposing sides, each having means for receiving and aligning a trough in predetermined alignment.

6. A cable routing system according to claim 3, wherein said trough is extruded, with said channel having a constant cross-section profile throughout a length of said trough.

7. A cable routing system according to claim 1 wherein said conduit has a slit extending therethrough along an axial dimension of said conduit.

8. A cable routing system according to claim 1 wherein said body ends are generally rectangular in cross-section and said conduit is generally circular in cross-section.

9. A cable routing system according to claim 1 wherein said inner wall means includes a retaining insert sized to be received within said body and opposing said second wall means with said conduit free end disposed between said body and said insert; means for urging said insert against said body to secure said conduit free end to said body.

* * * * *